United States Patent
Amita et al.

(10) Patent No.: US 7,594,937 B2
(45) Date of Patent: Sep. 29, 2009

(54) POROUS ANODE BODY FOR SOLID ELECTROLYTIC CAPACITOR, PRODUCTION METHOD THEREOF AND SOLID ELECTROLYTIC CAPACITOR

(75) Inventors: Hitoshi Amita, Kawasaki (JP); Kazuhiro Omori, Kanagawa (JP)

(73) Assignee: Showa Denko K.K., Tokyo (JP)

( * ) Notice: Subject to any disclaimer, the term of this patent is extended or adjusted under 35 U.S.C. 154(b) by 329 days.

(21) Appl. No.: 11/791,514

(22) PCT Filed: Nov. 28, 2005

(86) PCT No.: PCT/JP2005/022227
§ 371 (c)(1),
(2), (4) Date: May 24, 2007

(87) PCT Pub. No.: WO2006/057455
PCT Pub. Date: Jun. 1, 2006

(65) Prior Publication Data
US 2008/0106852 A1 May 8, 2008

Related U.S. Application Data

(60) Provisional application No. 60/633,119, filed on Dec. 6, 2004.

(30) Foreign Application Priority Data
Nov. 29, 2004 (JP) .......................... 2004-343853

(51) Int. Cl.
H01G 9/042 (2006.01)
(52) U.S. Cl. ..................... 29/25.03; 438/239; 438/386; 438/393; 438/658
(58) Field of Classification Search ................ 29/25.03; 438/239, 386, 393, 658
See application file for complete search history.

(56) References Cited

U.S. PATENT DOCUMENTS

| | | | |
|---|---|---|---|
| 1,728,941 A | 9/1929 | Marden et al. | |
| 2,516,863 A | 8/1950 | Gardner | |
| 3,647,420 A * | 3/1972 | Restelli | 75/622 |
| 3,697,255 A | 10/1972 | Baldwin et al. | |
| 4,084,965 A | 4/1978 | Fry | |
| 4,537,641 A | 8/1985 | Albrecht et al. | |
| 4,687,632 A | 8/1987 | Hurd et al. | |
| 4,722,756 A | 2/1988 | Hard | |
| 4,960,471 A | 10/1990 | Fife et al. | |
| 4,964,906 A | 10/1990 | Fife | |
| 5,011,742 A | 4/1991 | Fife et al. | |
| 5,242,481 A | 9/1993 | Kumar | |
| 6,024,914 A | 2/2000 | Yoshida | |
| 6,136,062 A | 10/2000 | Loffelholz et al. | |
| 6,171,363 B1 * | 1/2001 | Shekhter et al. | 75/369 |
| 6,322,912 B1 * | 11/2001 | Fife | 428/702 |
| 6,527,937 B2 * | 3/2003 | Fife | 205/209 |
| 6,558,447 B1 * | 5/2003 | Shekhter et al. | 75/252 |
| 6,786,951 B2 * | 9/2004 | He et al. | 75/365 |
| 6,914,769 B2 * | 7/2005 | Welsch et al. | 361/508 |
| 2001/0036056 A1 * | 11/2001 | Kimmel et al. | 361/508 |
| 2002/0028175 A1 * | 3/2002 | Fife | 423/592 |
| 2002/0114722 A1 * | 8/2002 | Kimmel et al. | 419/45 |
| 2002/0135973 A1 * | 9/2002 | Kimmel et al. | 361/509 |
| 2002/0141936 A1 * | 10/2002 | Fife | 423/592 |
| 2003/0003044 A1 * | 1/2003 | Fife | 423/592 |
| 2003/0026756 A1 * | 2/2003 | Kimmel et al. | 423/592 |
| 2003/0112577 A1 * | 6/2003 | Kabe et al. | 361/271 |
| 2004/0008472 A1 * | 1/2004 | Tripp | 361/508 |
| 2004/0033183 A1 * | 2/2004 | Fife | 423/62 |
| 2004/0040415 A1 * | 3/2004 | Kimmel et al. | 75/232 |
| 2005/0008564 A1 * | 1/2005 | Reed et al. | 423/594.17 |
| 2005/0025699 A1 * | 2/2005 | Reed et al. | 423/594.17 |
| 2005/0225927 A1 * | 10/2005 | Tagusagawa et al. | 361/271 |
| 2006/0275204 A1 * | 12/2006 | Tagusagawa et al. | 423/594.17 |
| 2007/0137434 A1 * | 6/2007 | Omori et al. | 75/244 |

FOREIGN PATENT DOCUMENTS

| | | |
|---|---|---|
| EP | 0 953 847 A1 | 11/1999 |
| EP | 1 291 100 A1 | 3/2003 |
| GB | 870930 | 6/1961 |
| GB | 1266065 | 3/1972 |
| JP | 11-111575 A | 4/1999 |
| JP | 2001-345238 A | 12/2001 |
| JP | 2002-25864 A | 1/2002 |

(Continued)

Primary Examiner—George Fourson
(74) Attorney, Agent, or Firm—Sughrue Mion, PLLC

(57) ABSTRACT

The invention provides a method of manufacturing a porous anode for a solid electrolytic capacitor, comprising a step of subjecting a molded body containing powder of at least one material selected from oxygen-containing niobium material and oxygen-containing tantalum material and a pore-forming agent which is solid at reduction temperature to reduction reaction using reducing agent and another step of removing the pore-forming agent from the reduction reaction product and a solid electrolytic capacitor using an anode obtained thereby. As niobium material and tantalum material, at least one material selected from niobium, niobium alloy, niobium compound, tantalum, tantalum alloy and tantalum compound is used respectively. In the invention, the peak position, the number and quantity of pores can be optimized according to the cathode agent used, whereby a solid electrolytic capacitor having an improved property for impregnation with cathode agent, high capacitance, low ESR, good tan δ characteristics and long-term reliability, is obtained.

30 Claims, 7 Drawing Sheets

FOREIGN PATENT DOCUMENTS

| | | |
|---|---|---|
| JP | 2003-13115 A | 1/2003 |
| WO | WO 98/19811 | 5/1998 |
| WO | WO 00/15555 | 3/2000 |
| WO | WO 00/15556 | 3/2000 |
| WO | WO 00/67936 | 11/2000 |
| WO | WO 00/69588 | 11/2000 |
| WO | WO 2004/097870 A1 | 11/2004 |

* cited by examiner (A)            (B)

(A)  (B)

(A)  (B)

(A)  (B)

(A)

(B)

(A)

(B) 2

(C) 2

(D)

(A) (B) (C) (D)

POROUS ANODE BODY FOR SOLID ELECTROLYTIC CAPACITOR, PRODUCTION METHOD THEREOF AND SOLID ELECTROLYTIC CAPACITOR

CROSS-REFERENCE TO RELATED APPLICATIONS

This is an application filed pursuant to 35 U.S.C. Section 111(a) with claiming the benefit of U.S. provisional application Ser. No. 60/633,119 filed Dec. 6, 2004 under the provision of 35 U.S.C. 111(b), pursuant to 35 U.S.C. Section 119(e) (1).

TECHNICAL FIELD

The present invention relates to a method of manufacturing a niobium- or tantalum-based porous anode for a solid electrolytic capacitor, which method is capable of adjusting a pore distribution (peak position of diameter, average pore diameter, and pore volume) to be suitable for impregnating a cathode agent and capable of easily controlling the oxygen amount. In addition, the present invention relates to a solid electrolytic capacitor using a niobium- or tantalum-based porous anode obtained by that method, having excellent high capacitance, low ESR, and excellent tan δ characteristics, as well as long-term reliability.

BACKGROUND ART

Small-sized capacitors having large capacitance have been desired for the use in electronics such as cellular phones and personal computers. Of the capacitors, tantalum capacitors and niobium capacitors, which have large capacitance for their sizes and have good performances, have been preferably employed. Furthermore, in recent electronic devices, low-voltage, high-frequency, and/or low-noise operation is desired. In solid electrolytic capacitor, higher capacitance, low ESR (equivalent series resistance), and improved tan δ characteristics are being demanded.

For the anode of a capacitor which uses a valve-acting metal, a valve-acting metal alloy, a valve-acting metal compound or the like, in general, a porous anode made of a valve-acting metal aggregate powder, a valve-acting metal alloy aggregate powder or a valve-acting metal compound aggregate powder has been used.

For attaining high capacitance, low ESR and improved tan δ characteristics, both large specific surface area of a porous anode and good property for impregnation with a cathode agent provided as an opposite electrode. For making the specific surface area of the porous anode larger, the size of a primary powder that constitutes the anode is made small. In this case, however, a minute primary powder may inevitably create small pores. In production of any capacitor using a porous anode, a sufficient amount of a solid electrolyte needs to be efficiently impregnated into the deep parts of the respective pores from the surface of the anode. In particular, in the case of a large porous anode having a volume of 10 mm$^3$ or more in which the distance from the surface to the deep part is long, solid electrolyte can not be sufficiently impregnated into small pores. Moreover, there is another problem that uniform pores cannot be formed owing to variation in pore size. Therefore, there has been desired a porous anode having a pore diameter distribution suitable for each kind of cathode agent to be used.

When niobium, niobium oxide, tantalum, tantalum oxide, or the like is used as a valve-acting metal, a valve-acting metal alloy or a valve-acting metal compound to be used in the anode of a capacitor, generally, a niobium aggregate powder, a niobium oxide aggregate powder, a tantalum aggregate powder, a tantalum oxide aggregate powder or the like, each having a controlled oxygen content, which is produced through reduction treatment on niobium or tantalum containing oxygen, is employed. As a method for producing these aggregate powders, reduction treatment is conventionally known.

U.S. Pat. Nos. 4,722,756, 4,960,471, JP 03-229801 A (U.S. Pat. No. 4,964,906), JP2002-507247 A (WO1998/019811), JP2002-524378 A (WO2000/015555) and JP 2002-524379 A (WO2000/015556) describe about manufacturing methods using oxygen getter metal. U.S. Pat. No. 4,537,641 and JP 2002-544375 A (WO2000/067936) describe about methods in which a reductant is gasified and then subjected to a reaction. U.S. Pat. Nos. 1,728,941 and 4,687,632 describe about manufacturing methods where a halogenated salt or the like is used as an auxiliary agent. U.S. Pat. Nos. 3,697,255, 5,242,481, GB 870930 B and JP 2002-544677 A (WO2000/069588) describe about manufacturing methods where alkali metals, alkali earth metals, rare earth metals, aluminum, carbon, or the like are used. JP 03-170648 A (U.S. Pat. No. 5,011,742) and JP 2003-13115 A describe about manufacturing methods in which a reductant and a valve-acting metal are placed apart from each other and then allowed to react. GB 1266065 B and JP 2000-119710 A (U.S. Pat. No. 6,136,062) describe about manufacturing methods in which reduction reaction is carried out in two steps at controlled temperatures. U.S. Pat. No. 2,516,863 describes about a manufacturing process in which silicon alloy or metal hydride is used as a reductant. JP 11-111575 A describes about a process of manufacturing a sintered anode in which a molded product for an anode having an implanted anode lead coexists with a reductant and then heated.

However, each of those manufacturing methods intends to control the oxygen amount without proactively controlling pore formation and therefore, when a solid electrolytic capacitor is prepared using a sintered anode obtained by any one of the above manufacturing methods, it is difficult to form pores suitable for impregnation of a cathode agent. In particular, the use of a larger sintered body (anode) of 10 mm$^3$ or more in size results in poor impregnation of the cathode agent. As a result, the resulting capacitor has problems of its low capacitance, high ESR and increased tan δ.

JP 2001-345238 A describes a manufacturing process in which a pore-forming agent is used. In the document, magnesium, magnesium hydride, calcium, calcium hydride, aluminum and so on are exemplified as acid-soluble pore-forming agents. However, those pore-forming agents are materials which are used as reductants in the prior art documents as described above. Therefore, even if a capacitor is produced by using a powder material prepared by the method using such an acid-soluble pore-forming agent described in the document, none of the problems of low capacitance, high ESR, and increased δ can be solved just as in the case with the other prior art documents as described above.

DISCLOSURE OF THE INVENTION

An object of the present invention is to provide: a method of manufacturing a porous anode for a solid electrolytic capacitor having a pore distribution being controlled within the range suitable for impregnating a cathode agent, which enables production of a capacitor having high capacitance, low ESR and good tan δ characteristics as well as being excellent in long-term reliability including moisture resistance, high-temperature load life or the like; and an electrolytic capacitor using the anode.

The present invention relates to a method of manufacturing a porous anode for a solid electrolytic capacitor as described below, a porous anode obtained by such a method, and a solid electrolytic capacitor using such a porous anode and the use thereof.

[1] A method of manufacturing a porous anode for a solid electrolytic capacitor, comprising a step of subjecting a molded body containing powder of at least one material selected from an oxygen-containing niobium material and an oxygen-containing tantalum material and a pore-forming agent which is solid at reduction temperature to reduction reaction using a reducing agent and another step of removing the pore-forming agent from a resulting product of the reduction reaction.

[2] The manufacturing method according to the above item 1, in which the niobium material is at least one selected from niobium, a niobium alloy, and a niobium compound and the tantalum material is selected from tantalum, a tantalum alloy and a tantalum compound.

[3] The manufacturing method according to the above item 1 or 2, in which the oxygen content of the oxygen-containing niobium material or the oxygen-containing tantalum material is 50% by mass or less and the material contains at least one crystal selected from niobium, hexaniobium monoxide, niobium monoxide, niobium dioxide, niobium pentoxide, tantalum and tantalum pentoxide.

[4] The manufacturing method according to the above item 1, in which the oxygen-containing niobium material includes at least one element selected from hydrogen, boron, nitrogen, antimony, tantalum, zirconium, tungsten, silicon and aluminum.

[5] The manufacturing method according to the above item 1, in which the oxygen-containing tantalum material includes at least one element selected from hydrogen, boron, nitrogen, antimony, niobium, zirconium, tungsten, silicon and aluminum.

[6] The manufacturing method according to any one of the above items 1 to 5, in which the molded body contains silicon nitride.

[7] The manufacturing method according to any one of the above items 1 to 6, in which the reducing agent is at least one selected from metals, alloys and hydrides thereof, having oxygen affinity higher than that of tantalum.

[8] The manufacturing method according to the above item 7, in which the reducing agent is at least one selected from the group consisting of lithium, sodium, potassium, rubidium, beryllium, magnesium, calcium, strontium, barium, lanthanum, cerium, praseodymium, neodymium, samarium, europium, gadolinium, terbium, dysprosium, holmium, erbium, thulium, ytterbium, lutetium, misch metal, yttrium, aluminum, tantalum, niobium, carbon, silicon, alloys and hydrides thereof, and hydrogen.

[9] The manufacturing method according to any one of the above items 1 to 8, in which the configuration of the molded body is from a molded body having a lead or a thin molded body integrated with a substrate, in which the lead or the substrate is at least one selected from niobium, a niobium alloy, a niobium compound, tantalum, a tantalum alloy and a tantalum compound.

[10] The manufacturing method according to the above item 9, in which the thickness of the molded body is 1 mm or less.

[11] The manufacturing method according to any one of the above items 1 to 10, further including a step of sintering the molded body before the reduction reaction step and the pore-forming agent is solid at the sintering temperature.

[12] The manufacturing method according to the above item 11, in which the sintering is carried out at a temperature of 500 to 2,000° C.

[13] The manufacturing method according to any one of the above items 1 to 12, in which the molded body or a sintered body thereof is mixed with a reducing agent before the reduction reaction step.

[14] The manufacturing method according to the above item 13, in which the mixing is carried out at a temperature of 50° C. or lower.

[15] The manufacturing method according to any one of the above items 1 to 14, in which in the reduction reaction step, heating is carried out at a temperature of from 450 to 2,000° C.

[16] The manufacturing method according to the above item 15, in which the heating is carried out at a temperature-rising rate of 12° C. per minute or less.

[17] The manufacturing method according to any one of the above items 1 to 16, further including a step of carrying out slow oxidation using an oxygen-containing gas diluted to 0.1 to 21% by mass in oxygen content with an inert gas before the step of removing a pore-forming agent after the reduction reaction step.

[18] The manufacturing method according to the above item 17, in which the slow oxidation is carried out at a temperature of 60° C. or lower.

[19] The manufacturing method according to any one of the above items 1 to 18, in which the step of removing the pore-forming agent is one in which the removal is carried out using at least one solvent selected from water, an organic solvent, an acidic solvent, an alkaline solvent, an amine-containing solvent, an amino acid-containing solvent, a poly-phosphoric acid-containing solvent, a crown ether solvent, a chelator-containing solvent, an ammonium salt-containing solvent and an ion exchange resin-dispersing solvent.

[20] The manufacturing method according to the above item 19, in which the temperature for removing the pore-forming agent is 50° C. or lower.

[21] The manufacturing method according to any one of the above items 1 to 20, further including a step of removing the remaining reducing agent before the step of removing the pore-forming agent after the reduction reaction step.

[22] The manufacturing method according to the above item 21, in which the step of removing the remaining reducing agent is carried out at a temperature of from 450 to 2,000° C. under highly-reduced pressure.

[23] The manufacturing method according to any one of the above items 1 to 22, further including a step of doping the molded body or the sintered body with at least one element selected from the group consisting of nitrogen, boron, phosphorus, sulfur, selenium, tellurium, aluminum, silicon and antimony before the reduction reaction step or before the step of removing the pore-forming agent after the reduction reaction step.

[24] The manufacturing method according to any one of the above items 1 to 23, further including a step of dehydrogenation before the reduction reaction step, during the reduction reaction step, before the step of removing the pore-forming agent after the reduction reaction step or after the step of removing the pore-forming agent.

[25] An anode for a solid electrolytic capacitor manufactured by the method described in any one of the above items 1 to 24.

[26] A method for producing a solid electrolytic capacitor, wherein a porous anode for the solid electrolytic capacitor is manufactured by the method described in any one of the above items 1 to 24, which is provided as one electrode and a counter electrode is provided via a dielectric material.

[27] The method for producing a solid electrolytic capacitor according to the above item 26, wherein the capacitor has a structure in which the two or more porous anodes are electrically connected in parallel to each other.

[28] The solid electrolytic capacitor produced by the method according to the above item 26.

[29] An electronic circuit, wherein the solid electrolytic capacitor according to the above item 28 is mounted.

[30] An electronic instrument, wherein the solid electrolytic capacitor according to the above item 28 is mounted.

BEST MODE FOR CARRYING OUT OF THE INVENTION

[1] Mixture Molded Body

Figure 1:
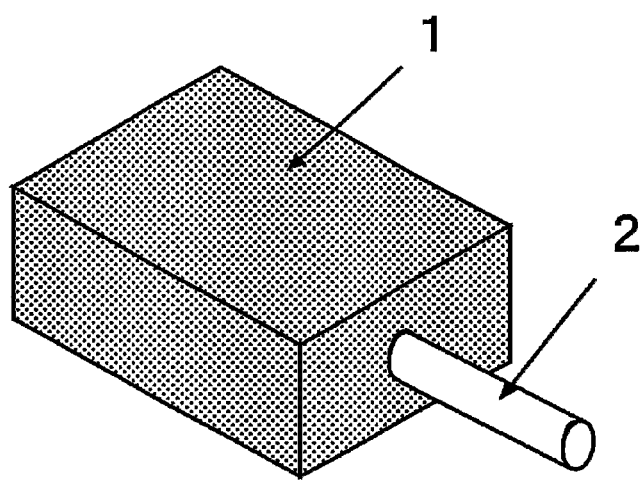
FIG. 1 is a perspective diagram of a rectangular porous anode with a lead

The mixture molded body which is a starting material in the manufacturing method of the present invention, is made of a mixture that contains a powder made of at least one material selected from an oxygen-containing niobium material and an oxygen-containing tantalum material and a pore-forming agent. Any of a primary powder not having been subjected to processing such as aggregation, a secondary aggregate powder as an aggregated powder of the primary powder, and granulated powders as the granulate of the primary or secondary powder may be used as the powder. As a primary powder, a powder having an average particle diameter of 0.01 to 4 µm is preferred. As a secondary aggregated powder, a powder having an average particle diameter of 0.1 to 20 µm is preferred. As a granulated powder, a powder having an average particle diameter of 0.2 to 200 µm is preferred. The powder can be suitably used in the form of any one of a ball shape, a rod shape, a flat shape, a flake shape, and so on, without depending on a particular shape. Therefore, it is desirable to use a powder having a larger specific surface area with less thermal history.

By using a mixture solution in which the powder and the pore-forming agent are mixed with a medium, the mixture molded body used as a starting material can assume various shapes. Examples of the shape include a mixture powder obtained by drying the above mixture solution, a mixture molded body obtained by subjecting the granulated powder of the mixture to compression molding, a mixture molded body obtained by placing the above mixture solution into a mold or the like and eliminating the medium therefrom, and a mixture molded body obtained by coating, printing or impregnating the above mixture solution onto a film, foil, plate, wire, or the like. Furthermore, a leading line, in a form of wire, rod, foil, plate or the like may be planted in or welded on such a molded body. In addition, if required, any procedure such as preliminary aggregation by heating a mixture powder or molded body may be carried out.

In addition, when the molded body is molded using a die or the like, a mold-releasing agent may be used for preventing an edge defect or the like by applying or spraying the agent on the surface of the die. Any mold-releasing agent may be used without any limitation unless any of the remaining ingredients of the agent affects the electric characteristics of a capacitor. Preferred are a fluorine-, BN-, silicon-, sulfonic acid- and stearic acid-based lubricants.

Examples of the solvent to be used upon preparation of a mixture solution include water, alcohols, ethers, cellosolves, ketones, esters, amides, sulfoxides, sulfones, aliphatic hydrocarbons, aromatic hydrocarbons and halogenated hydrocarbons. It is preferable to select a solvent in which the pore-forming agent is less soluble. Further, an inexpensive solvent present in liquid state at a temperature at which a mixture solution is prepared, is preferable. Specific examples of the solvent that is preferably used include water, methanol, ethanol, n-propanol, isopropanol, ethyleneglycol, propyleneglycol, tetrahydrofuran, dioxane, methylisobutyl ether, methyl cellosolve, diglyme, acetone, methylethyl ketone, methylisobutyl ketone, cyclohexanone, isophorone, methyl acetate, ethyl acetate, N,N-dimethyl formamide, N,N-dimethyl acetamide, dimethyl sulfoxide, sulfolane, cyclohexane, hexane, benzene, toluene, dichloromethane, dichloroethane, chloroform, trichlene, carbon tetrachloride, and chlorobenzene.

In addition, a conventional mixer can be used upon preparation of a mixture solution. Examples of mixer include a shaking mixer, a V-type mixer, a conical blender, a bead mixer, a Nauta mixer, a twin-roll mill, a triple-roll mill, a ball mill, a sand mill, a pebble mill, a thoron mill, a sand grinder, a Szegvari attritor, an impeller disperser, a ultrasonic disperser, a homogenizer, a kneader, an impulse mill and a stone mill.

The ratio (solid content) of the sum of the powder and the pore-forming agent in the mixture solution varies depending on, for example, the shape of the molded body and the kind of the solvent. In general, however, it is 10% by mass or more and less than 100% by mass. If the concentration of the mixture is too small, excessive time and heat will be required to distill the solvent off. Therefore, the concentration is preferably 20% by mass or more but less than 100% by mass, particularly preferably 30% by mass or more but less than 100% by mass.

The temperature in preparing the mixture solution is preferably from −80 to 120° C. If the temperature is too high, the surface of niobium or tantalum can be oxidized to cause an increase in oxygen content. The increase in the oxygen content, which leads to an increase in the usage of the reducing agent required for the reduction reaction, is not preferred in economic terms. Too low a temperature, which leads to an increase in the number of incidental equipments such as freezer, is not preferred in economic terms. Therefore, the temperature is preferably in the range of −40 to 50° C., more preferably in the range of −10 to 40° C., and particularly preferably in the range of 0 to 30° C. The time required for the mixing is typically from 10 minutes to 100 hours, but not specifically limited as far as it is one minute or more.

A binder can be blended in the mixture solution. Any of an inorganic binder and an organic binder can be used. In general, examples of the binder that can be used include:

soap fatty acids such as camphor, naphthalene and stearic acid; acrylic polymers such as carbowax, vegetable wax, refined paraffin, polyacrylic acid, a polyacrylate and polyacrylamide; methacrylic polymers such as polymethacrylic acid, a polymethacrylate and polymethacrylamide;

polyvinyl-based polymers such as polyvinyl alcohol, polyvinyl butyral and polyvinyl acetate; and polyethylene carbonate. Although the blending amount of the binder cannot be flatly defined depending on the kind of binder, it is generally 1 to 15 parts by mass, preferably 2 to 10 parts by mass, further preferably 3 to 8 parts by mass, provided that the sum of the powder and the pore-forming agent is 100 parts by mass.

The mixture solution prepared as described above may be directly used for formation of a mixture molded body or may be adjusted to a desired concentration by partially distilling off the solvent therein and then used for the formation of a molded body. Alternatively, the mixture solution may be molded after drying the solvent out or may be molded at first followed by drying the solvent out. The distillation of the solvent is carried out at a temperature of from −40 to 200° C. under appropriate pressure ranging from reduced pressures to applied pressures, depending on the boiling point of the solvent used. In general, the distillation is preferably carried out at a range of room temperature to 120° C. under reduced pressure. The solvent may be distilled off by any one of the conventional methods such as hot-air drying, spray drying, vacuum heat drying, fluidized drying, standing drying and freeze drying. In the case of making a granulated powder, it is preferable to dry the solvent during the granulation using a Nauta mixer, a Ribocone dryer, an agitation dryer or the like.

The oxygen-containing niobium material or oxygen-containing tantalum material, which is one of the materials constituting the mixture, may contain an alloy or complex of niobium or tantalum and another component and any one or more of carbon, boron, phosphorus, nitrogen and the like in addition to niobium or tantalum containing oxygen. Those materials may be hydrogenated. The oxygen-containing niobium or, niobium alloy, tantalum alloy, niobium compound or tantalum compound, or any one of their hydrides contains 50% by mass or less of oxygen. Preferably, the oxygen content is 0.01 to 30% by mass, more preferably 0.1 to 15% by mass. Such niobium material and/or tantalum material may contain at least one kind of crystals such as Nb, $Nb_6O$, NbO, $NbO_2$, $Nb_2O_5$, Ta, and $Ta_2O_5$.

In the niobium alloy, niobium compound, tantalum alloy, and tantalum compound, examples of components other than niobium, tantalum and oxygen include at least one element selected from the group consisting of hydrogen, beryllium, magnesium, calcium, strontium, barium, scandium, yttrium, titanium, zirconium, hafnium, vanadium, chromium, molybdenum, tungsten, manganese, rhenium, ruthenium, osmium, rhodium, iridium, palladium, platinum, silver, gold, zinc, cadmium, mercury, boron, aluminum, gallium, indium, thallium, carbon, silicon, germanium, tin, lead, nitrogen, phosphorus, arsenic, antimony, bismuth, sulfur, selenium, tellurium, lanthanum, cerium, praseodymium, neodymium, samarium, europium, gadolinium, terbium, dysprosium, holmium, erbium, thulium, ytterbium and lutetium. From the viewpoint of stabilizing leakage current characteristics (LC), at least one element selected from the group consisting of hydrogen, yttrium, zirconium, hafnium, vanadium, molybdenum, tungsten, manganese, rhenium, zinc, boron, aluminum, silicon, nitrogen, phosphorus, antimony, neodymium, erbium, ytterbium and lutetium is preferable. An abundance of elemental components other than niobium, tantalum and oxygen is preferably from 0.01 to 10 atom %.

The state of the alloy and compound may be, for example, amorphous, noncrystalline, glass, colloid and crystal. In order to enhance heat resistance of the capacitor, the alloy and the compound each preferably further include at least one element selected from the group consisting of boron, nitrogen, antimony, zirconium, tungsten, silicon and aluminum. In a case where nitrogen and silicon are to be contained, silicon nitride may be blended. Specific examples of silicon nitride include SiN, $Si_2N_2$, $Si_2N_3$ and $Si_3N$. The state of the silicon nitride may be amorphous, noncrystalline, glass, colloid, crystal or the like.

The powder made of such a niobium or tantalum material can be manufactured by any one of methods known in the art, such as those for production of a niobium powder, a niobium compound powder or a niobium alloy powder, as described in U.S. Pat. No. 4,084,965, JP 10-242004 A (EP 953847), JP 2002-25864 A and so on.

The pore-forming agent, which is another material constituting the mixture, is preferably a substance that is substantially unreactive with the niobium and tantalum materials and exists as a solid at the temperature at which the reduction reaction is carried out (generally at 450° C. or higher). Specifically, the substance is preferably an oxide or a compound that is an oxide in performing the reduction reaction step. In addition, when a preliminary aggregation is carried out through sintering before the reduction reaction step, it is preferable that the pore-forming agent be in the same state as above at a sintering temperature (generally at 500° C. or higher) for the preliminary aggregation.

By using a pore-forming agent remaining in a solid state during the reduction reaction step, excessive aggregation of powder made of a niobium material and/or a tantalum material at reduction reaction temperature can be prevented to thereby allow the niobium material and/or the tantalum material to be fused together only at a contact point between them. In a case where a pore-forming agent which is liquefied at reduction reaction temperature is used, the effect of preventing the volume shrinkage of powder made of a niobium material and/or a tantalum material decreases and thus the resulting pores may be smaller than desired. In addition, the pore-existing ratio may become disproportionate. Furthermore, in a case where a pore-forming agent which is gasified at reduction reaction temperature is used, the pore-forming agent may escape through any space between the powder particles made of the niobium material and/or the tantalum material at reaction temperature, thereby forming only smaller sized pores. These are true of not only reduction reaction step but also preliminary aggregation step.

Furthermore, by preventing the excessive aggregation of the powder made of a niobium material and/or a tantalum material, the density of the porous anode can be controlled to optimum for achieving good property for impregnation with the cathode agent in a manufacturing process of a capacitor. Therefore, the anode can have a large specific surface area and whereby obtain an increased capacitance per unit volume.

Examples of the pore-forming agent include: oxides of at least one kind selected from lithium, sodium, potassium, beryllium, magnesium, calcium, strontium, barium, scandium, yttrium, lanthanum, titanium, zirconium, hafnium, vanadium, manganese, rhenium, iron, ruthenium, cobalt, rhodium, iridium, nickel, copper, zinc, cadmium, mercury, boron, aluminum, gallium, indium, thallium, silicon, germanium, tin, lead, antimony, bismuth, cerium, praseodymium, neodymium, samarium, europium, gadolinium, terbium, dysprosium, holmium, erbium, thulium, ytterbium, and lutetium; and hydroxides, carbonates and hydrogencarbonates that provide those oxides. The pore-forming agent may be used alone or two or more kinds of them may be used as a mixture.

The pore-forming agent is removed by a step subsequent to the reduction reaction, preferably by means of a solvent. Therefore, the pore-forming agent may be preferably one having good solubility to the solvent. Furthermore, since the pore-forming agent is dissolved and removed, it is advantageous for economic reasons to use an inexpensive one. Accordingly, particularly preferred examples of the pore-forming agent include at least one compound selected from the group consisting of sodium carbonate, sodium hydrogencarbonate, potassium carbonate, potassium hydrogencarbonate, lithium oxide, lithium carbonate, magnesium oxide, magnesium hydroxide, magnesium carbonate, magnesium hydrogencarbonate, magnesium calcium carbonate, calcium oxide, calcium hydroxide, calcium carbonate, barium oxide, barium carbonate, hafnium oxide, yttrium oxide, yttrium hydroxide, yttrium carbonate, lanthanum oxide, lanthanum hydroxide, lanthanum carbonate, cerium oxide, cerium hydroxide, cerium carbonate, neodymium oxide, neodymium hydroxide, neodymium carbonate, samarium oxide, samarium hydroxide, samarium carbonate, manganese oxide, manganese carbonate, iron oxide, iron hydroxide, iron carbonate, iron magnesium oxide, iron lead oxide, zinc oxide, barium zinc oxide, boron oxide, aluminum oxide, aluminum hydroxide, tin oxide, lead oxide and lead carbonate.

The amount of the pore-forming agent required is an amount which enables formation of pores with the desired pore ratio of the porous anode (the ratio of the pores present in the porous anode), although it is unnecessary to use an excessive amount. The amount also varies depending on the molecular weight, shape, average particle size, bulk density, and tapping density of the pore-forming agent to be used. In general, however, on the basis of the sum of the amount of the niobium material and/or the tantalum material and the amount of the pore-forming agent, it is preferably 70% by mass or less, more preferably 50% by mass or less.

It is preferable that the pore-forming agent used be powdery and the shape of particles, which may be any shape such as spherical, rod, flat and flake shape, does not affect the use.

The particle diameter of the pore-forming agent has an influence on the pore diameter of the pores formed in the porous anode used as a positive electrode. Further, the pore diameter of the porous anode affects both the capacitance of a capacitor and the property for impregnation with a cathode agent in the process of manufacturing the capacitor. If the property for impregnation with cathode agent is good, the resulting capacitor may have high capacitance, low ESR, and good tan δ characteristics. The cathode agent cannot impregnate satisfactorily into a porous anode which has a small peak in its pore diameter distribution. The pore diameter of the porous anode for the capacitor is preferably 0.01 to 100 μm in average diameter, more preferably 0.1 to 20 μm. In addition, it is also possible to improve the impregnation property, particularly property for impregnation with an inorganic solid electrolyte, by distributing a plurality of peaks at 0.1 μm or more in the pore diameter distribution and using a combination of pores of the desired pore size and pores of the comparatively large size.

As described above, the pore-forming agent exists in the form of a solid at reduction reaction temperature and is removed by an appropriate solvent. Thus, the average diameter of the pore formed in the porous anode of the present invention is almost the same as the average particle size of the pore-forming agent. Therefore, it is preferable that the pore-forming agent have an average particle size of 0.01 to 100 μm, more preferably 0.1 to 20 μm. In addition, by mixing two or more pore-forming agents having different average particle sizes from each other, a pore-forming agent having two or more peaks in particle size distribution may be prepared and used. Specifically, the impregnability of a cathode agent into a chemically formed porous anode can be improved by using a combination of a pore-forming agent having an average particle size of 0.1 μm or more but less than 1 μm, more preferably 0.3 μm or more but less than 1 μm and another pore-forming agent having an average particle size of 1 μm or more, preferably 1 to 20 μm, more preferably 1 to 5 μm. For example, in order to provide the pore diameter distribution of the porous anode with peaks at 0.7 μm and at 2 μm and also control the volume of the pores having a diameter of 1 μm or more to 13% by volume or more of the total pore volume, two pore-forming agents having average particle sizes of about 0.7 μm and about 2 μm respectively may be used in combination to thereby make the ratio of the pore-forming agent having 1 μm or more in diameter to 13% by volume or more.

By preparing and using a mixture solution in which powder composed of at least one selected from the niobium material and the oxygen-containing tantalum material and the pore-forming agent are mixed in a medium as described above, a molded body of the mixture as a starting material of the manufacturing method of the present invention can assume various forms as described below.

(i) Granulated Powder of Mixture:

The granulated powder of the mixture can be prepared by heating the above mixture solution having a solid content of about 10 to 80% by mass at about 40 to 60° C. for about 3 to 100 hours under a reduced pressure of about $1 \times 10^2$ to $1 \times 10^3$ Pa by means of a granulator-dryer such as Henschel mixer or Nauta mixer. The average particle size of the resulting granulated powder of the mixture is generally in the range of 0.1 to 10 mm, which may vary depending on the revolution speed of the agitator, a clearance between the agitator and the inner wall of the container or the like. If required, particles having larger particle sizes may be crushed using a crushing machine such as a roll granulator to thereby make the average particle size within the range of about 0.2 to 1 mm. By making the average particle size within a predetermined range, the fluidity of the particles can be improved to thereby prevent maldistribution of pores at the time of molding.

(ii) Molded Body Having Lead:

A molded body having a lead can be prepared by subjecting the above granulated powder of the mixture having an average particle size of about 0.1 to 10 mm to preliminary granulation at a temperature of about 300 to 2,000° C. for about 20 minutes to 100 hours under highly reduced pressure and if required, crushing the granulated powder with a crushing machine such as a roll granulator to adjust the average particle diameter within about 0.02 to 1 mm, followed by molding with a molding machine while inserting a lead wire into the molded body.

If required, a binder as described above may be added before molding. In addition, a mold-releasing agent such as a fluorine-, silicon-, BN- or stearic acid-based lubricant may be used for preventing chipping or the like defects at the time of molding.

As the leading line, a wire, rod or the like made of a niobium material or a tantalum material (niobium, a niobium alloy, a niobium compound, tantalum, a tantalum alloy, or a tantalum compound) may be used.

Furthermore, the molded body having a lead can be prepared by casting the above mixture solution having a solid content of about 50 to 98% by mass into an air-permeable and liquid-permeable casting die made of, for example, ceramics, dehydrating and drying the resultant, separating a molded body from the mold, sticking thus molded bodies together so as to sandwich a lead between them, and then sintering the resultant at about 500 to 2,000° C. for 20 minutes to 100 hours under highly reduced pressure. If required, a binder as above described or a deflocculant such as aromatic sulfonate or aliphatic sulfonate may be used. In addition, the above mixture solution may be cast into a casting die and then pressurized into a predetermined shape.

(iii) Molded Body Having No Lead:

A mold body having a complicated structure can be prepared by casting a mixture solution having a solid content of about 50 to 98% by mass into an air-permeable and liquid-permeable casting die made of ceramics, dehydrating and drying the resultant, sintering the resultant at about 500 to 2,000° C. for 20 minutes to 100 hours under highly reduced pressure, and separating sintered body from the mold. If required, a binder as described above or a deflocculant such as aromatic sulfonate or aliphatic sulfonate may be used. In addition, the above mixture solution may be cast into a casting die and then pressurized into a predetermined shape.

(iv) Thin Molded Body:

The term "thin molded body" refers to one in the form of a sheet or plate shape having the thinnest portion with a thickness of 1.0 mm or less. The thin molded body can be prepared by applying or printing a mixture solution having a solid content of about 30 to 98% by mass on an appropriate releasable substrate and, after drying, releasing a molded body from the substrate. In this case, it is preferable to use a binder as described above. After applying or printing on the releasable substrate, the substrate may be pressurized to the extent that no significant deformation occurs. Examples of releasable substrate include plastic films such as a polyethylene film, a polypropylene film, a polyvinylchloride film, a polyvinylidene chloride film, a polyethylene terephthalate film, a polyethylenenaphthalate film, a polyvinyl alcohol film, a polycarbonate film, a nylon film, a polystyrene film, and an ethylene-vinyl acetate copolymer film, and an ethylene-vinyl copolymer film, as well as plastic sheets, paper, impregnation paper, a metallic foil such as aluminum foil and metallic sheets. Any of them may be used without any particular limitation as far as it possesses desired strength and releasability. Preferred is polyethylene telephthalate film or sheet. Coating can be performed by a known method. For example, air doctor coating, blade coating, rod coating, extrusion coating, air knife coating, squeeze coating, impregnation coating, a reverse roll coating, transfer roll coating, gravure coating, kiss coating, cast coating or spray coating may be employed without any problem. For the printing method, screen-printing, silk screen printing, intaglio-printing, flat plate printing, or the like can be employed. In particular, silk screen printing is preferred in that formation of the molded body of the mixture into any a desired shape, for example, a rectangular such as a sheet or plate shape, a coin shape, a comb shape and a tooth shape becomes easy. Onto the releasable substrate, a mold-releasing agent such as a fluorine-, silicon-, BN-, or stearic acid-based lubricant may be applied in advance.

(v) Thin Molded Body Integrated with a Substrate:

The term "thin molded body integrated with a substrate" refers to one prepared by forming a layer of the mixture described above on a substrate made of at least one selected from niobium, a niobium compound, a niobium alloy, tantalum, a tantalum compound, and a tantalum alloy in the form of, for example, a sheet, foil, plate, comb, teeth or strip shape and then integrating them together. The mixture layer can be formed by printing or applying the mixture solution having a solid content of 30 to 98% by mass on the substrate and, after drying, sintering the resultant at about 500 to 2,000° C. for 20 minutes to 100 hours under highly reduced pressure. In printing or applying the mixture, the binder described above may be preferably used and before the sintering, the binder may be preferably removed at about 50 to 500° C. under highly reduced pressure. In addition, after applying or printing on the above substrate or after drying, the shape of the substrate may be fixed by applying pressure on the substrate to the extent that no significant deformation occurs. As coating or printing method, any one of the above described methods can be used without any trouble. The mixture layer may be formed only on one side of the substrate or on both front and back surfaces thereof. The thin molded body integrated with the substrate, obtained as described above, may have the thinnest portion with a thickness of 1.0 mm or less, preferably 0.6 mm or less, particularly preferably 0.4 mm or less.

[2] Reduction Reaction Step

The mixture molded body obtained as described above is reacted with a reducing agent. By carrying out this step, the oxygen content of a niobium material and/or a tantalum material decreases.

As a reducing agent, any known material, such as metals, alloys and hydrides thereof, that has oxygen affinity equal to or higher than that of niobium or tantalum can be used. Examples thereof include alkali metals such as lithium, sodium, potassium and rubidium, alkaline earth metals such as beryllium, magnesium, calcium, strontium, and barium, rare earth metals such as lanthanum, cerium, praseodymium, neodymium, samarium, europium, gadolinium, terbium, dysprosium, holmium, erbium, thulium, ytterbium and lutetium, misch metal, yttrium, aluminum, carbon, silicon, alloys, hydrides, alloy hydrides thereof, and hydrogen. Of those, from the viewpoint of reduction ability, handling, availability, cost effectiveness or the like, magnesium, calcium, barium, and aluminum are preferred. Each of those reducing agents may be used independently or two or more of them may be used in combination. In addition, the reaction may be repeated twice or more using the same reducing agent or using different reducing agents. The reducing agent can be suitably used in any shape such as powder, agglomerate, chip, linear, rod or sponge shape. The reducing agent is preferably in the size of about 10 μm to 3 cm, although the size depends on the shape thereof.

Upon initiating the reduction reaction, it is preferable that the mixture molded body provided as a starting material be in contact with the reducing agent at predetermined temperature. The contact may be any one of solid contact, liquid contact and gas contact. If required, a metal halide such as calcium chloride, magnesium chloride and potassium chloride may be used as a reaction aid. It is preferable that before the reduction reaction, the reducing agent exist in a solid state in the reaction vessel and be in contact with the mixture molded body used as a starting material. In a case where the mixture molded body and the reducing agent are placed separately without contacting, the reduction reaction itself proceeds when the reducing agent in gaseous or liquid state comes in contact with the mixture. However, in a case where the reducing agent is a gas when reacted with the mixture, a large part of the gas which does not participate in the reaction is present in a space portion of the reaction vessel, which leads to an increase in the amount of the reducing agent used and is economically disadvantageous. It is preferable that the surface of the mixture molded body used as a starting material be in contact with the reducing agent in the form of powder, agglomerate, chip or sponge shape or the like.

The amount of the reducing agent used is stoichiometric quantity or more required for reducing the oxygen amount which is to be removed from the oxygen-containing niobium material and/or tantalum material. The required amount of the reducing agent may vary depending on the conditions such as the volume of the spaced portion of the reaction vessel and the reaction temperature. In general, however, the removal of oxygen can be attained using 1 to 10 equivalents, preferably 1 to 5 equivalents, more preferably 1 to 2 equivalents of the reducing agent with respect to the oxygen amount desired to be removed. If it is desired to remove the oxygen almost completely, a large excess amount of the reducing agent may be used in liquid.

The mixture and the reducing agent thus prepared may be placed in a tray made of niobium or tantalum and then placed in a reaction vessel where the reduction reaction is carried out. Before the reaction, it is desirable to sufficiently substitute the air in the reaction vessel with an inert gas such as argon or helium. If a large amount of the air remains in the reaction vessel, an additional amount of the reducing agent may be required for oxygen present in the air and thus it is not economically preferable. The reduction reaction may be carried out under reduced, normal or increased pressure. In a case where a reducing agent which becomes a gaseous form at reduction reaction temperature is used, it is preferable to carry out the reaction under reduced pressure. Removing the oxygen from the system under reduced pressure allows the reducing agent to sufficiently touch the surface of the niobium material and/or tantalum material at the time of the reduction reaction.

In a case where the reducing agent is not liquid or gas at 450° C. at the time of conducting a liquid contact or gas contact, the minimum value of the above specified temperature range is the temperature at which the reducing agent becomes liquid or gas. Generally, provided that the minimum value is 700° C., a variety of reducing agents can be employed.

Temperature for performing the reduction reaction varies depending on the kind of the reducing agent. In general, the reduction reaction is performed at 450 to 2,000° C. The reduction reaction proceeds extremely quickly and generates a large amount of heat. If the reaction proceeds without control, niobium or tantalum with the oxygen amount reduced by the reduction may be partially molten and the specific surface area thereof may be decreased. Therefore, it is preferable that the reaction be carried out slowly at as low a temperature as possible. The reaction temperature is preferably 450 to 1,200° C., more preferably 450 to 1,000° C., particularly preferably 450 to 850° C. The reaction time is typically one minute or more. However, for the above reason, the reaction time is preferably 20 minutes or more, more preferably 1 hour or more, particularly preferably 2 hours or more.

For carrying out the reaction slowly, an excessively high temperature-rising rate is not preferable. The temperature-rising rate is preferably 12° C./min or less, more preferably 10° C./min or less, particularly preferably 8° C./min or less. As temperature-rising method, the temperature may be continuously risen at a constant rate, or may be risen by changing the temperature-rising rate within the range of 12° C./min or less. Alternatively, the temperature-rising may be performed by a step-by-step approach where in the temperature-rising process, an appropriately selected temperature lower than the target temperature is maintained for 1 minute to 20 hours and then the temperature is further enhanced. This step may be repeated twice or more until the temperature reaches the target temperature.

After completion of the reduction reaction, the reaction vessel and the reaction product are cooled. Before taking out the product of the reduction reaction from the reaction vessel, for the purpose of stabilizing the niobium, niobium alloy, niobium compound, tantalum, tantalum alloy, or tantalum compound having a reduced oxygen amount, it is preferable to slightly oxidize the surface thereof. In addition, in consideration for possibility of heat generation due to oxidation reaction caused by contact between the remaining reducing agent and the air, sufficient cooling is preferable. Specifically, cooling is performed preferably to 60° C. or lower, more preferably to 50° C. or lower, particularly preferably to 40° C. or lower. Cooling may be performed to 0° C. or less, however, it leads to increase in costs on equipments such as freezer and also increase in the time period required and therefore is not preferred in economic terms. Therefore, a particularly preferred temperature range for cooling is from 0° C. to 40° C. There is no specified temperature-lowering rate, and the higher the temperature lowering rate, the more preferable. Moreover, after completion of the reducing reaction, before taking out the reaction product from the vessel, for example, an additional step of continuously heating at 450 to 2,000° C. under highly reduced pressure to thereby remove the remaining reducing agent may be provided.

When the reaction product is taken out from the reaction vessel being sufficiently cooled off, it is preferable that a method (gradual oxidation of the surface of the reaction product), in which the reaction vessel is deaerated using inert gas containing a smaller oxygen amount (21% or less) than that of the atmosphere (air) and then placed under reduced pressure, followed by filling with the inert gas, be carried out once to several ten times to stabilize the surface of the reaction product by slow oxidization. When the oxidation proceeds very fast, the oxidation generates heat to increase the temperature, thereby causing an increase in oxygen content (in an extreme case, the oxygen content after reduction reaction is larger than the oxygen content before the reduction reaction). The inert gas used may be helium, argon, nitrogen, or the like. It is preferable that the oxygen content in the gas be increased gradually, for example, from 0.5% by mass, 1% by mass, 2% by mass, 3% by mass and then 5% by mass to 10% by mass, to thereby finally fill the vessel with the atmosphere. Subsequently, after left standing for 1 minute to 100 hours, the reaction product is taken out. The temperature at the time of gradual oxidation is preferably kept at 60° C. or lower, more preferably 50° C. or lower, particularly preferably 40° C. or lower. The temperature higher than 60° C. is not preferable because the oxidation may proceed quickly at such a temperature.

[3] Step of Removing Pore-Forming Agent

By removing an oxide of the reducing agent generated in the reduction reaction and the pore-forming agent from the reduction reaction product in which the oxygen content is controlled, a valve-acting metal porous anode for the anode of a capacitor in which the content of oxygen is controlled is produced. If the porous anode is a molded body having a lead, the porous anode may be directly used as an anode material without modification. If the porous anode is a molded body having no lead, it can be used as an anode material by welding a lead wire, lead foil or the like made of niobium, a niobium alloy, tantalum, a tantalum alloy, or the like. As for the welding, spot welding is preferable.

As a method of removing the pore-forming agent and the oxide of the reducing agent, for example, there is a method in which each of them is dissolved in a solvent. The solvent used may be any solvent as far as the solvent can dissolve the pore-forming agent or the oxide of the reducing agent to a sufficient degree and a solvent which is inexpensive and hardly remains after the removal step.

If the pore-forming agent or the oxide of the reducing agent is water-soluble, then the solvent used may be water.

If the pore-forming agent or the oxide of the reducing agent is organic solvent-soluble, an organic solvent can be used as the solvent. Examples of the organic solvent that can be used include: alcohols such as methanol, ethanol, and isopropanol; ethers such as tetrahydrofuran and dioxane; cellosolves such as methyl cellosolve and diglyme; ketones such as acetone and methylisobutyl ketone; sulfoxides such as dimethyl sulfoxide (DMSO); and amides such as dimethyl formamide (DMF).

As far as the pore-forming agent or the oxide of the reducing agent is acid-soluble, the solvent used may be any one of acidic solvents including nitric acid, sulfuric acid, phosphoric acid, boric acid, carbonic acid, hydrofluoric acid, hydrochloric acid, hydrobromic acid, hydriodic acid, and an organic acid.

If the pore-forming agent or the oxide of the reducing agent is alkali-soluble, the solvent used may be any one of hydroxides of alkali metals, hydroxides of alkaline earth metals, and alkaline solvents such as ammonia.

If the pore-forming agent or the oxide of the reducing agent forms a soluble complex, the solvent may be one which can be a ligand thereof, for example, any solution of amine such as ammonia or ethylene diamine, amino acid such as glycine, polyphosphoric acid such as sodium tripolyphosphate, crown ether, thiosulfate salt such as sodium thiosulfate or chelating agent such as ethylenediaminetetraacetic acid, may be used.

In addition, a solution of ammonium salt such as ammonium chloride, ammonium nitrate or ammonium sulfate, a solvent having a cation exchange resin or an anion exchange resin dispersed therein can be also suitably used.

In consideration for the removal of the pore-forming agent by using a solvent, examples of combination of the pore-forming agent and the solvent include combination of barium oxide and water, combination of calcium carbonate (which becomes calcium oxide) and hydrochloric acid, a combination of aluminum oxide and an aqueous solution of sodium hydroxide and combination of magnesium carbonate (which becomes magnesium oxide) and an aqueous solution of tetrasodium ethylenediamine tetraacetate.

It is preferable that the temperature for dissolving and removing the pore-forming agent or the oxide of the reducing agent be low. As the niobium or tantalum metal has high affinity to oxygen, so that the surface oxidation of the porous anode may be accelerated when the removal-by-dissolving temperature is high. Therefore, the removal-by-dissolving temperature is preferably 50° C. or lower, more preferably −10 to 40° C., particularly preferably 0 to 30° C. In addition, for the above reasons, it is preferable to select a method involving less heat generation at the time of dissolving and removing. For instance, in a case where a metal oxide or metal carbonate is used as the pore-forming agent, the method of dissolving and removing with acid involves generation of neutralization heat or the like. Therefore, it is preferable to select any one of methods involving less heat generation, for example, a method using water or an organic solvent to dissolve the pore-forming agent or the oxide of the reducing agent, a method in which a soluble complex is formed using an ammonium nitrate aqueous solution or ethylenediaminetetraacetic acid, and a method using a solution containing an ion exchange resin to dissolve the pore-forming agent or the oxide of the reducing agent.

After removing the pore-forming agent and the oxide of the reducing agent by using a solvent, washing is sufficiently performed with water to remove the solvent. For instance, in a case where nitric acid or ammonium chloride is used as a solvent to remove the pore-forming agent or the like and ion exchange water is used for washing out nitric acid or an ammonium chloride solvent, it is preferable to wash out until the electric conductivity of ion exchanged water after washing becomes 5 μS/cm or less. After sufficient washing, under appropriate pressure, the resultant is dried at 120° C. or lower, preferably 80° C. or lower, more preferably 50° C. or lower. The time required for drying can be shortened under reduced pressure and also the drying temperature can be lowered. After drying, slow oxidation is performed as described above, thereby obtaining a porous anode for a capacitor.

In the present invention, before the reduction step, or before the step of removing the pore-forming agent after the reduction step, there may be provided an additional step of doping at least one element into the mixture molded body, in which the element to dope is selected from the group consisting of nitrogen, boron, phosphorous, sulfur, selenium, tellurium, aluminum, silicon and antimony. When nitrogen is doped, a method such as gas nitridation, ion nitridation or solid nitridation is employed. Of those, the gas nitridation method, which enables uniform doping of nitrogen on the surface of niobium particles, is preferred. In addition, this doping treatment may be carried out on the mixture molded body (anode) after the completion of the reduction reaction or before the removal of the pore-forming agent. Alternatively, it may be carried out after the step of removing the pore-forming agent. In general, the gas nitridation is carried out in the presence of nitrogen gas by heating at 200 to 2,000° C. for one minute to 100 hours.

In a case where boron is doped, gas-boriding or solid-boriding may be used. For instance, the oxygen-containing niobium material and/or tantalum material may be left standing together with a boron source of boron halide such as a boron pellet or trifluoroboron at 2,000° C. or lower for several minutes to several ten hours under reduced pressure.

Gas-sulfuration, ionic-sulfuration, or solid-sulfuration may be used for doping of sulfur. For instance, a method of gas-sulfuration using a sulfur gas atmosphere can be attained by leaving the oxygen-containing niobium material and/or tantalum material standing in the sulfur atmosphere. The desired sulfurized amount of niobium is obtained when the temperature of the sulfuration atmosphere is 2,000° C. or lower and the standing time is within several ten hours. Furthermore, the treatment time can be shortened by carrying out the treatment at higher temperature.

In a case where silicon is doped, gas-silicification or solid-silicification may be used. For instance, the molded body may be left standing together with a silicon source of silicon powder, silicon halide, alkoxysilane or the like at 2,000° C. or lower for several minutes to several ten hours under reduced pressure.

Doping of the other elements can be also carried out based on any one of the methods described above.

In addition, when a material including hydride is used as the niobium material and/or tantalum material, before the reduction step, during the reduction step, before the step of removing the pore-forming agent after the reduction step, or after the step of removing the pore-forming agent, an additional step of carrying out dehydrogenation at 300 to 800° C. under highly reduced pressure may be provided.

[4] Porous Anode

The porous anode produced through the manufacturing method of the present invention is one formed of a niobium material and/or tantalum material with pores formed under control and a controlled amount of oxygen. Examples of components other than niobium, tantalum and oxygen, in the porous anode, include at least one element selected from the group consisting of, for example, hydrogen, beryllium, magnesium, calcium, strontium, barium, scandium, yttrium, titanium, zirconium, hafnium, vanadium, chromium, molybdenum, tungsten, manganese, rhenium, ruthenium, osmium, rhodium, iridium, palladium, platinum, silver, gold, zinc, cadmium, mercury, boron, aluminum, gallium, indium, thallium, carbon, silicon, germanium, tin, lead, nitrogen, phosphorus, arsenic, antimony, bismuth, sulfur, selenium, tellurium, lanthanum, cerium, praseodymium, neodymium, samarium, europium, gadolinium, terbium, dysprosium, holmium, erbium, thulium, ytterbium and lutetium. Preferred is at least one element selected from the group consisting of hydrogen, yttrium, zirconium, hafnium, vanadium, molybdenum, tungsten, manganese, rhenium, zinc, boron, aluminum, silicon, nitrogen, phosphorus, antimony, neodymium, erbium, ytterbium, and lutetium. These elements are used to be blended into the molded body. The states of niobium alloy, niobium compound, tantalum alloy and tantalum compound containing those elements may be, for example, amorphous, noncrystalline, glass, colloid, and crystal. In order to enhance heat resistance of a capacitor, the porous anodes preferably further contains at least one element selected from the group consisting of boron, nitrogen, antimony, zirconium, tungsten, silicon and aluminum. In the case of containing nitrogen and silicon, silicon nitride may be blended. Specific examples of silicon nitride include SiN, $Si_2N_2$, $Si_2N_3$, and $Si_3N_4$, and states of them may be, for example, amorphous, noncrystalline, glass, colloid and crystal.

The porous anode obtained by the manufacturing method of the present invention almost retains the configuration of the mixture molded body described above and can be formed into any one of various shapes as described above.

Figure 9:
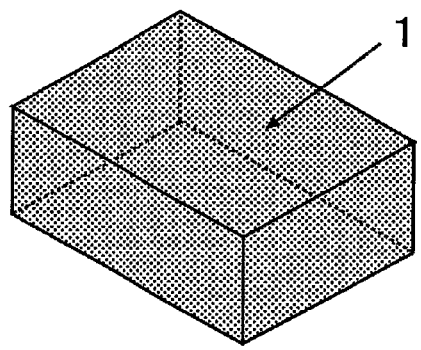
FIG. 9 are perspective diagrams that illustrate three different modes ((B) to (D)) of welding a lead to a rectangular porous anode (A) without a lead.
Figure 9:
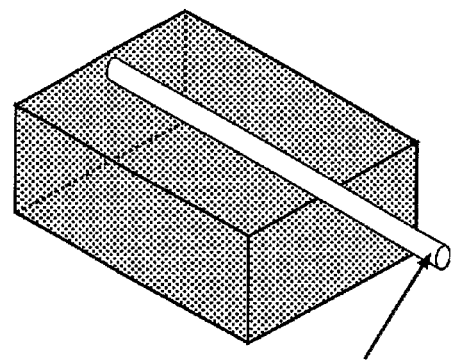
Figure 9:
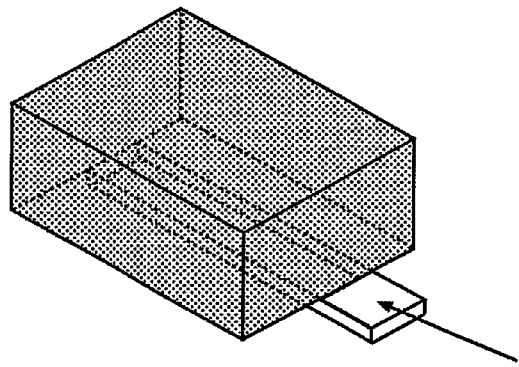
Figure 9:
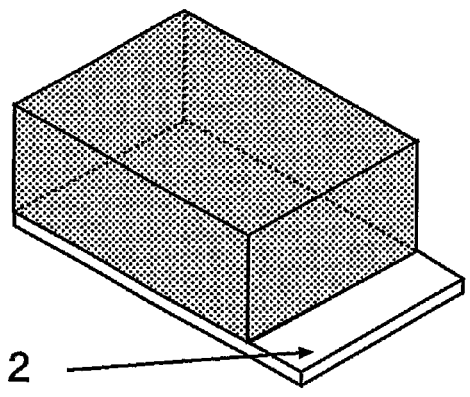
Figure 10:
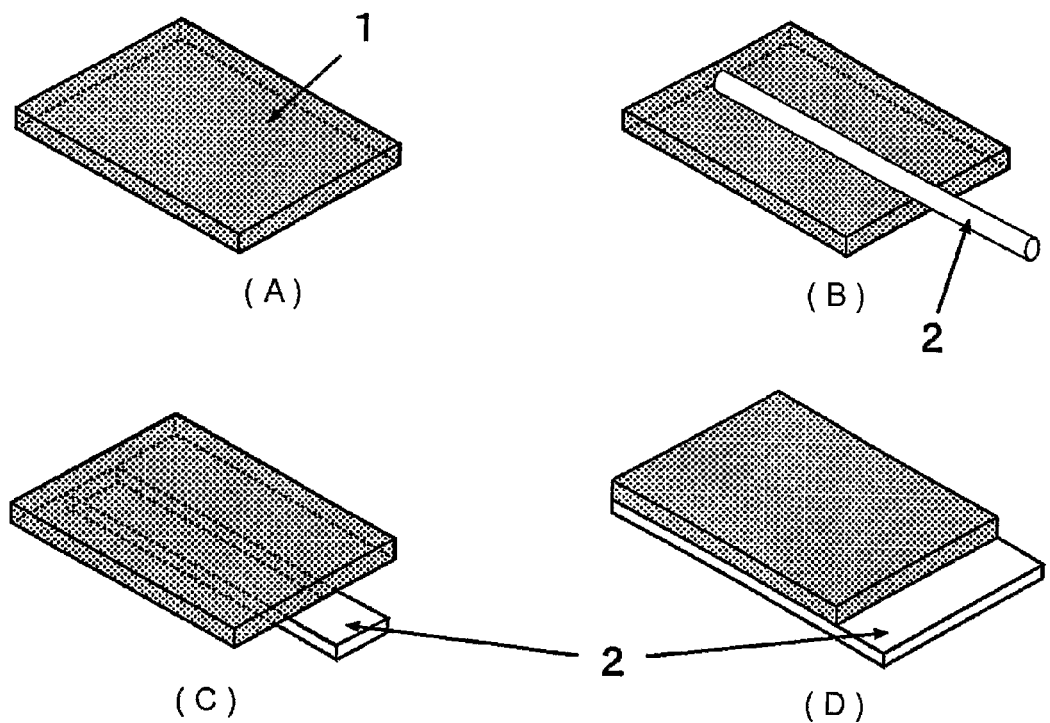
FIG. 10 are perspective diagrams that illustrate three different modes ((B) to (D)) of welding a lead to a thin porous anode (A) without a lead.

Specifically, as embodiments of the anode having a lead, for example, there are a rectangular porous anode as shown in FIG. 1, a thin (sheet-like or plate-like) porous anode as shown in FIG. 2(A), a cylindrical porous anode as shown in FIG. 6(A), and a rectangular-columnar porous anode as shown in FIG. 7(A). As an anode having no lead, for example, there are a rectangular porous anode as shown in FIG. 9(A) and a thin (sheet-like or plate-like) porous anode as shown in FIG. 10(A). Any of those having no lead may be used as an anode after adhering a leading line, leading foil or the like thereon by welding or the like as shown in FIGS. 9 and 10.

In addition, a thin anode integrated with a substrate can be also represented as shown in FIG. 4(A) and FIG. 8(A). In FIG. 4(A), a porous material is provided on both the top and bottom surface of the substrate. In FIG. 8(A), a porous material is mounted on one surface of the substrate. Such a substrate can also serve as a lead.

Examples of shape of the lead and the substrate include sheet, foil, plate, rode, wire, comb-like form, teeth-like form and strip which is made of at least one selected from the group consisting of niobium, a niobium compound, a niobium alloy, tantalum, a tantalum compound, and a tantalum alloy.

It is preferable that the thickness of a thin anode is be 1.0 mm or less, more preferably 0.6 mm or less, further preferably 0.4 mm or less.

If a capacitor is manufactured using any one of those porous anodes, the resulting capacitor shows good property for impregnation with a cathode agent and can have lower ESR than that of the conventional capacitor. In a case where ESR of a capacitor is further lowered, the capacitor can be produced such that a plurality of the porous anodes each integrated with a lead or a thin substrate of 1 mm or less in thickness are used and are electrically connected with each other in parallel. A still further decrease in ESR can be attained by arranging a plurality of porous anodes in parallel in a predetermined volume of the capacitor. Thus, the thickness of the porous anode is preferably 0.6 mm or less, more preferably 0.4 mm or less.

The substrate of the porous anode of the present invention may be directly used as a leading line of the anode. Alternatively, a wire, rod, foil or the like of at least one selected from niobium, a niobium alloy, a niobium compound, tantalum, a tantalum alloy, and a tantalum compound may be welded as a leading line.

The porous anode of the present invention has a density adjusted within the range of 0.3 to 7 g/ml when it is made of niobium, a niobium alloy or a niobium compound. In consideration of the strength of the porous anode or the capacitance of a capacitor obtained using the anode, a density of 0.6 to 6 g/ml is preferable. In the case of tantalum, a tantalum alloy or a tantalum compound, the density thereof can be adjusted within the range of 0.5 to 14 g/ml. In consideration of the strength and capacitance, the density is preferably in the range of 1 to 12 g/ml.

The amount of oxygen of the porous anode produced through the manufacturing method of the present invention can be adjusted to any amount of 0.05 to 30% by mass, although it depends on the specific surface area of the porous anode. In order to obtain a higher strength of the porous anode, the amount of oxygen is preferably 0.05 to 20% by mass, more preferably 0.05 to 16% by mass, and particularly preferably 0.05 to 12% by mass. The porous anode may contain at least one crystal selected from the group consisting of Nb, $Nb_6O$, NbO, $NbO_2$, $Nb_2O_5$, Ta and $Ta_2O_5$. Further, the anode may contain a crystal such as $Nb_2N$, NbN, NbB, $NbB_2$, $Nb_3Al$, $Nb_3Si$, $NbSi_2$, $Nb_3Sb$, $NbS_2$, $NbSe_2$ or $NbTe_4$.

The porous anode prepared by the manufacturing method of the present invention can be used as an anode for a capacitor and has the peak top within the range of 0.01 to 100 μm in the pore diameter distribution, which is suitable for impregnation with a cathode agent. Preferably, the peak top is at 0.1 to 20 μm. Needless to say of an anode for a small capacitor having a volume of less than 10 mm³, it is possible to adjust the peak top to be at 0.1 μm or more, further 0.3 μm or more in the pore size distribution even in an anode for a large capacitor having a volume of 10 mm³ or more. It is also possible to provide a plurality of pore peak tops at 0.1 μm or more. Specifically, a porous anode having at least two pore peak tops, one at 0.1 μm or more but less than 1 μm, preferably at 0.3 μm or more but less than 1 μm, and the other at 1 μm or more, preferably 1 to 20 μm, more preferably 1 to 5 μm, can be produced. For instance, for adjusting the peaks in the pore diameter distribution of the porous anode to be at 0.7 μm and 2 μm and adjusting the volume of the pores of 1 μm or more in diameter so as to account for 13% by volume or more of the total pore volume, pore-forming agents having average particle sizes of about 0.7 μm and about 2 μm are used in combination and the ratio of the pore-forming agent of 1 μm or more in diameter is adjusted to 13% by volume or more. In consideration for that the porous anode after chemical formed is impregnated with a cathode agent, the porous anode thus chemically formed to have two or more pore peaks in its pore size distribution has an improved property for impregnation with the cathode agent.

Furthermore, also in a large-sized anode which is an anode for a capacitor (hereinafter, the porous anode may be also referred to as an anode for a capacitor) having a volume of 10 mm³ or more and a pore ratio of 55% by volume or more, it is possible to easily adjust the volume of the pores of 1 μm or more in diameter so as to be 10% by volume or more of the total pore volume and to allow two or more peaks to be present at 0.3 μm or more, further at 0.5 μm or more. In addition, it is also possible to adjust the volume of the pores of 1 μm or more in diameter to be 13% by volume or more of the total pore volume.

In the anode for a capacitor obtained by the manufacturing method of the present invention, the specific surface area per unit volume can be controlled to be 0.005 m²/mm³ or more, further to be 0.008 m²/mm³ or more, still further to be 0.01 m²/mm³ or more. In addition, even in a case where the volume of the anode is increased, e.g., 50 mm³ or 100 mm³, there is no substantial decrease in property for impregnation with the cathode agent and ESR is also stable. In the anode for a capacitor of the present invention, for example, a CV value (a product of a formation voltage when formation is performed at 80° C. for 120 minutes in a 0.1-mass % aqueous phosphoric acid solution and a capacitance value at 120 Hz and) is 40,000 to 800,000 μFV/g.

The manufacturing method of the present invention achieves a high capacitance appearance ratio and a high capacitance of an anode for a capacitor simultaneously and thereby enables production of a capacitor of about 750 μF/capacitor (anode of about 20 mm²). It is also possible to prepare an anode having a capacitance of 1,000 μF/capacitor or more, furthermore 1,500 μF/capacitor or more with respect to anode of about 20 mm³, by using a primary powder having a high specific surface area with less thermal history.

[5] Capacitor Element

The solid electrolytic capacitor of the present invention is constructed of the porous anode obtained as described above which serves as one electrode and a dielectric material placed between the electrode and a counter electrode. Specifically, the capacitor is constructed such that the porous anode is provided as one electrode and the dielectric material is formed on the surface of the porous anode (including the pore surface), followed by mounting the counter electrode on the dielectric material. The dielectric material of the capacitor is preferably a dielectric material mainly containing niobium oxide or tantalum oxide, particularly preferably a dielectric material mainly containing niobium pentoxide or tantalum pentoxide. The dielectric material mainly containing niobium pentoxide can be obtained by, for example, carrying out electrolytic oxidation on the niobium-made porous anode which is one electrode. For carrying out electrolytic oxidation on the porous anode in an electrolytic solution, in general, an aqueous solution of protonic acid, e.g., 0.1% aqueous phosphoric acid solution, aqueous sulfuric acid solution, aqueous boric acid solution, 1% aqueous acetic acid solution or aqueous adipic acid solution, is used. In this way, the dielectric material of niobium oxide is obtained by chemical formation of a porous anode in an electrolytic solution, whereby the capacitor of the present invention becomes an electrolytic capacitor where a porous anode serves as an anode.

On the other hand, the other electrode in the capacitor of the present invention is at least one compound selected from an electrolytic solution, an organic semiconductor and an inorganic semiconductor.

Specific examples of the electrolytic solution include, as well as an aqueous mineral acid solution such as a sulfuric acid aqueous solution, a solution containing a primary solvent, such as γ-butyrolactone or ethylene glycol, and a solute such as quaternary ammonium salt or tertiary ammonium salt. More specifically, a mixture solution of dimethylformamide and ethylene glycol in which 5% by mass of isobutyl tripropylammonium borotetrafluoride electrolyte is dissolved, and a mixture solution of propylene carbonate and ethylene glycol in which 7% by mass of tetraethylammonium borotetrafluoride is dissolved can be exemplified.

Specific examples of the organic semiconductor include an organic semiconductor containing benzopyrroline tetramer and chloranil, an organic semiconductor containing tetrathiotetracene as its main component, an organic semiconductor containing tetracyanoquinodimethane as its main component, and an organic semiconductor containing an electroconductive polymer, as its main component, prepared by doping a dopant into a polymer having a repeating unit represented by formula (1) or (2).

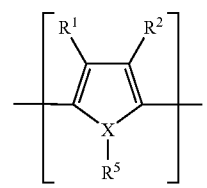

(1)

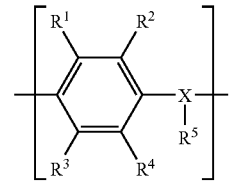

(2)

In formulae (1) and (2), $R^1$ to $R^4$, which may be the same with or different from each other, each represents a hydrogen atom, an alkyl group having 1 to 6 carbon atoms, or an alkoxy group having 1 to 6 carbon atoms, X represents an oxygen, sulfur or nitrogen atom, $R^5$, which exists only when X is a nitrogen atom, represents hydrogen or an alkyl group having 1 to 6 carbon atoms, and $R^1$ and $R^2$ and $R^3$ and $R^4$ may be bonded with each other to form a ring.

Furthermore, in the present invention, the electroconductive polymer containing a repeating unit represented by formula (1) may be preferably an electroconductive polymer containing a structural unit represented by formula (3) as a repeating unit.

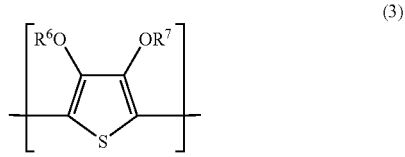

(3)

In the formula, $R^6$ and $R^7$ each independently represents a hydrogen atom, a linear or branched, saturated or unsaturated alkyl group having 1 to 6 carbon atoms, or a substituent in which the alkyl groups are bonded each other at arbitrary positions to form a cyclic structure of at least one 5-to-7-membered saturated hydrocarbon, which contains two oxygen atoms. In addition, examples of the above cyclic structure include a structure containing a vinylene bond which may be substituted and a phenylene structure which may be substituted. The electroconductive polymer having such a chemical structure is being charged and a dopant may be doped therein. Any of dopants known in the art can be used without limitation.

Examples of the polymer containing a repeating unit represented by any one of the formulae (1) to (3) include polyaniline, polyoxyphenylene, polyphenylene sulfide, polythiophene, polyfuran, polypyrrole, polymethylpyrrole, and substitution derivatives and copolymers thereof. Of those, polypyrrole, polythiophene, and substitution derivatives thereof (such as poly(3,4-ethylenedioxy thiophene)) are preferable.

Specific examples of the inorganic semiconductor include an inorganic semiconductor containing lead dioxide or manganese dioxide as its main component and an inorganic semiconductor containing iron oxide black. Each of those semiconductors may be used independently or two or more of them may be used in combination. In particular, a cathode agent of the inorganic semiconductor of lead dioxide or manganese dioxide has a form of an aggregate of fine particles having uneven sizes, thereby causing unevenness. Therefore, it is preferable to employ an anode for a capacitor having large pores and small pores at a suitable proportion. An anode for a capacitor having the peak top within the range of 0.01 µm to 100 µm, further within the range of 0.1 to 20 µm, and a plurality of pore peak tops at 0.1 µm or more in the pore diameter distribution, more preferably an anode for a capacitor having two or more peak tops, including one peak top at 0.1 to 1 µm, preferably 0.3 to 1 µm and another peak top at 1 µm or more, preferably 1 to 20 µm, more preferably 1 to 5 µm, can be suitably used in a case where a cathode agent of such an inorganic semiconductor is used.

When a semiconductor having an electric conductivity of $10^{-2}$ to $10^3$ S/cm is used as each of the organic semiconductor and the inorganic semiconductor, the impedance value of the capacitor obtained becomes low and the capacitance at high frequency can be further enhanced.

Furthermore, by arranging two or more of capacitor anodes each integrated with the substrate above electrically in parallel to constitute a single capacitor, ESR of the capacitor can be further lowered. In general, when n number of capacitor anodes are arranged electrically in parallel, the ESR becomes about 1/n (n is positive integer) as compared with a case where a single anode is used in a capacitor. For example, when three capacitor anodes are arranged in parallel, the ESR thereof becomes about ⅓ as compared with a case where a single anode is used in a capacitor. Therefore, it is preferable that as many capacitor anodes as possible be arranged electrically in parallel in the volume of the capacitor. The porous anode obtained by the manufacturing method of the present invention can be also preferably used even in such a capacitor.

Figure 2:
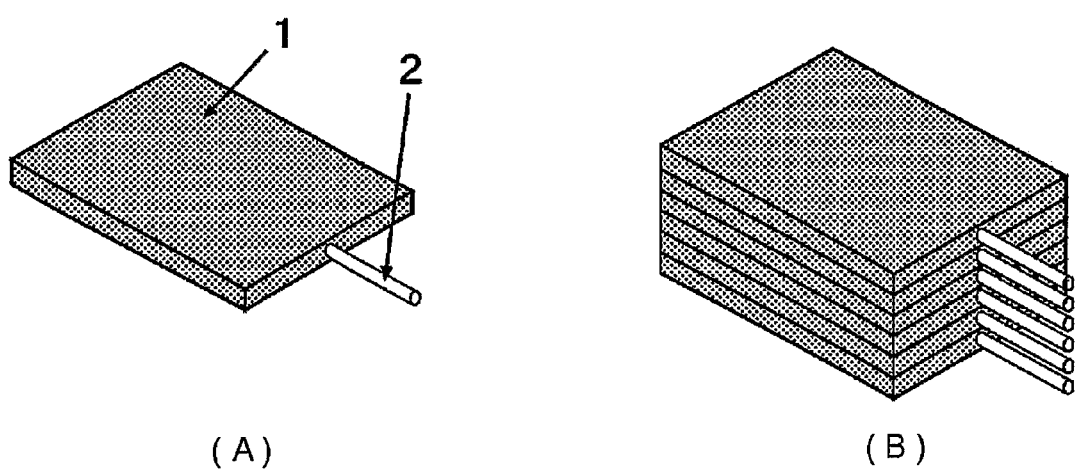
FIG. 2(A) is s perspective diagram of a thin porous anode 1 having a lead 2, and (B) is a perspective diagram of an example of laminated anodes shown in FIG. 2 (A).
Figure 3:
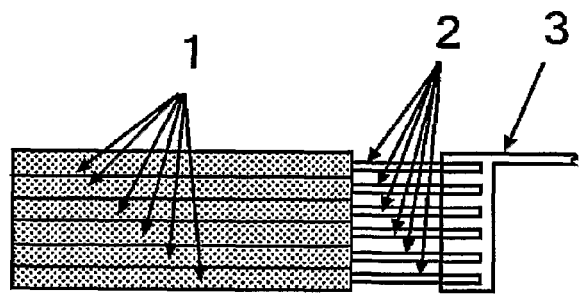
FIG. 3 is a cross-sectional view that illustrates the usage of a laminated type anode unit of FIG. 2. (In the Figure, the reference number 3 indicates a lead frame.)
Figure 4:
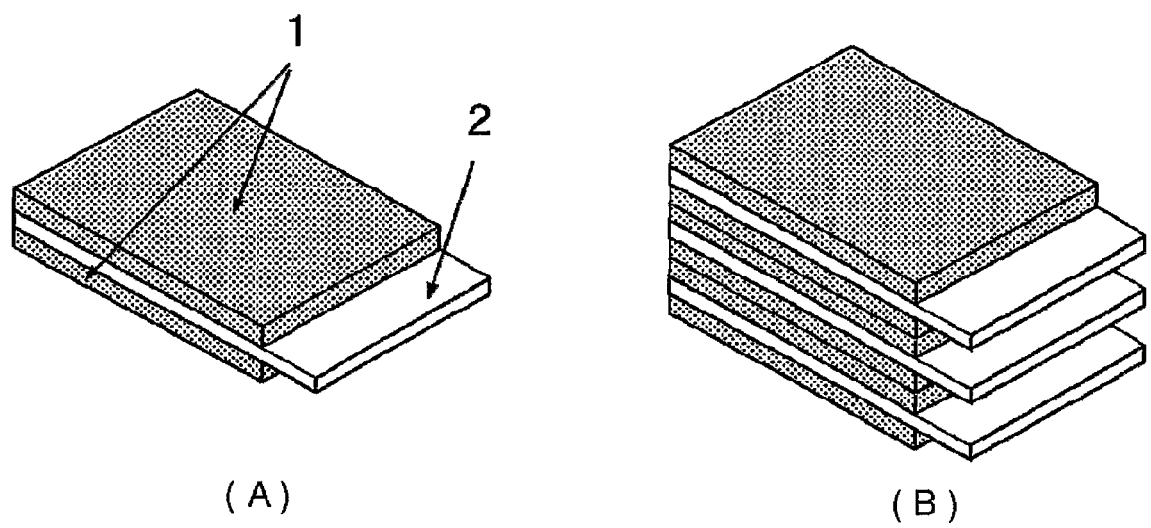
FIG. 4(A) is a perspective diagram of a thin porous anode having a lead, integrated with a substrate on the both sides, and FIG. 4 (B) is a perspective diagram of an example of laminated anodes of FIG. 4 (A).
Figure 5:
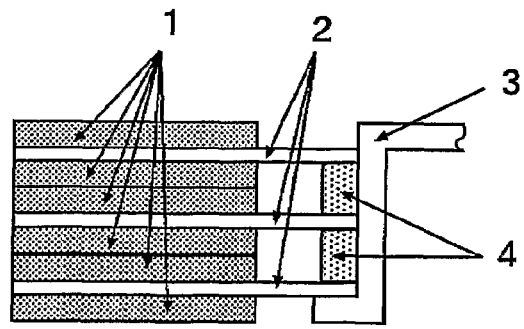
FIG. 5 is a cross sectional view that illustrates the usage of a laminated type anode. (In the Figure, the reference number 4 indicates a spacer.)
Figure 8:
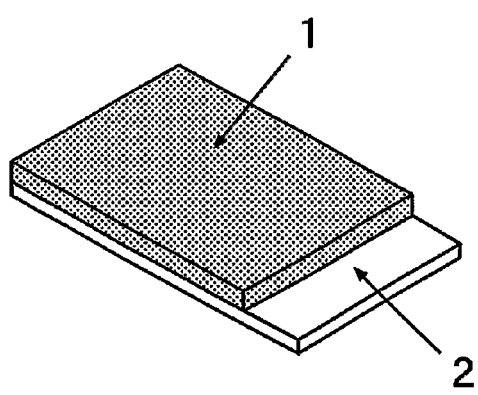
FIG. 8 (A) is a perspective diagram of a thin porous anode having a lead, where one side thereof is combined with a substrate, and FIG. 8 (B) is a perspective diagram of an example of laminate of anodes of FIG. 8 (A).
Figure 8:
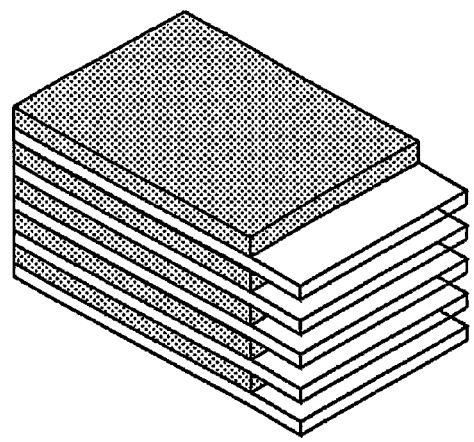

Specifically, as shown in FIGS. 2 and 3, multiple anodes can be arranged and connected electrically in parallel by stacking the porous material part of each of multiple thin anodes having leads one on another and connecting the leads 2 using a lead frame 3. In addition, as shown in FIGS. 4, 5 and 8, capacitor anodes integrated with the respective substrates can be arranged and connected electrically in parallel by stacking in the same manner as above. As shown in FIG. 5, for connecting the substrate portion used as a lead to a lead frame (3), a spacer (4) such as foil or plate made of niobium or tantalum may be also used.

Figure 11:
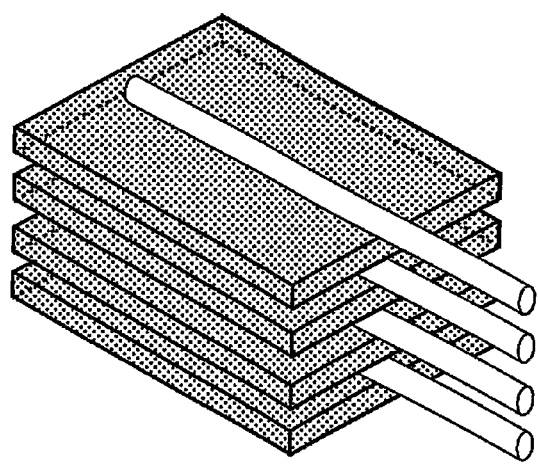
FIG. 11 is a perspective diagram of an example of laminate of thin porous anodes on each of which a rod-shape lead is welded.
Figure 12:
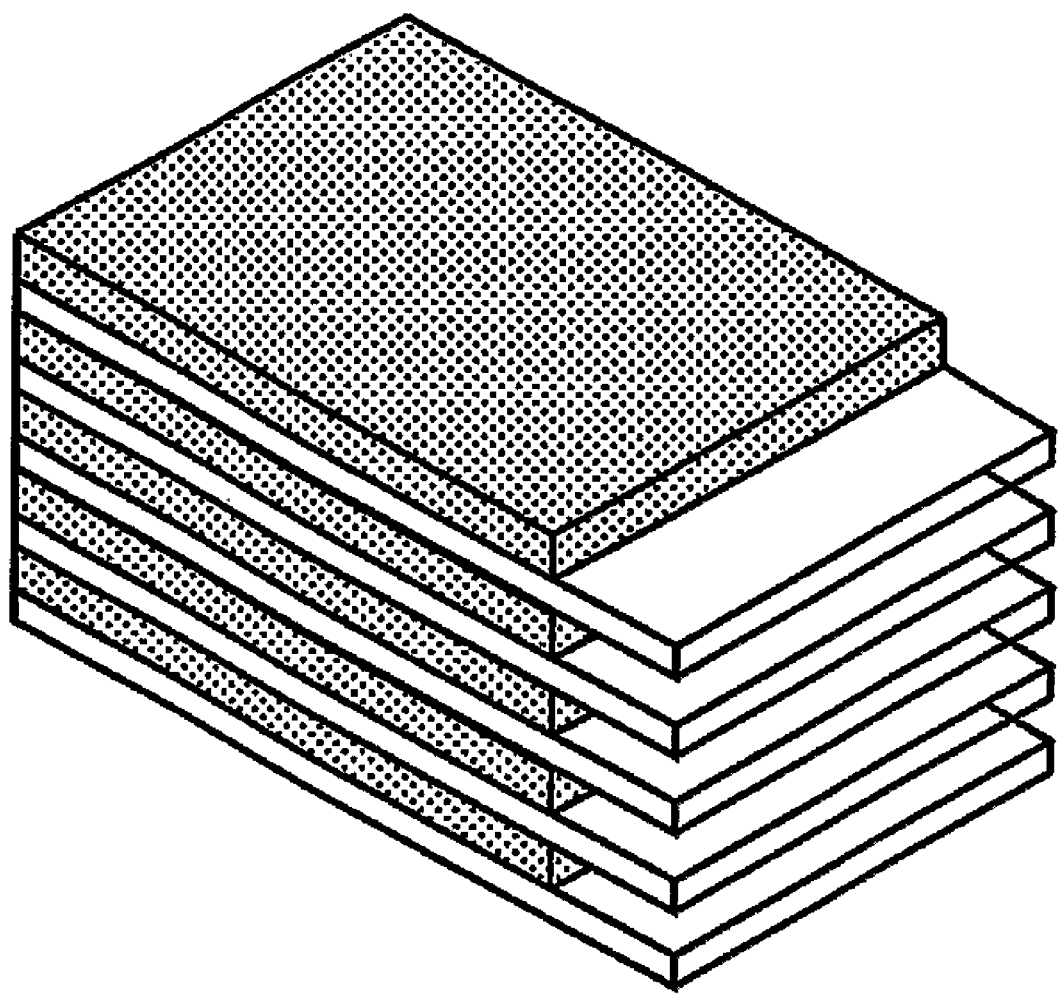
FIG. 12 is a perspective diagram of an example of laminate of thin porous anodes on each of which a plate-shape lead is welded.

Even in the case of using a thin anode where a lead is attached after manufacturing an anode having no lead as shown in FIG. 10, it is possible to stack one on another, arrange and connect electrically in parallel as shown in FIGS. 11 and 12. In addition, even in a case of a cylindrical type (FIG. 6(A)) or a rectangular-columnar type (FIG. 7(A)) which is not thin, anodes can be electrically arranged and connected in parallel as shown in FIG. 6(B) and FIG. 7(B).

When the thin anodes connected with leads or thin anodes integrated with the substrates are placed one on another, the thickness of each thin anode is preferably 1 mm or less, more preferably 0.6 mm or less, and further preferably 0.4 mm or less. Thus, 2 to 1,000 anodes can be electrically connected with each other.

Furthermore, when the other electrode is of a solid type, an electric conductor layer may be provided on the other electrode to improve an electrical contact with an outer lead (for example, lead frame). The electric conductor layer can be formed, for example, by solidification of a conductive paste, metal-plating, metal-vaporization, and the formation of a heat-resistant conductive resin film. Preferable examples of the conductive paste used include silver paste, copper paste, aluminum paste, carbon paste, and nickel paste, which can be used independently or may be used in combination. When two or more of them are used, they may be mixed or may be laminated as different layers. After being applied, the conductive paste may be left standing in the air or may be heated to solidify. Examples of the plating include nickel plating, copper plating, silver plating and aluminum plating. In addition, the vaporization metals include aluminum, nickel, copper and silver.

Specifically, for example, a carbon paste and a silver paste are laminated on the other electrode sequentially, and then encapsulated with a material such as an epoxy resin to construct a capacitor. This capacitor may have niobium or tantalum leads which have been molded and sintered integrally with the porous anodes or which have been welded after molding the anodes.

For example, the capacitor of the present invention constructed as described above can be provided as a capacitor product for various kinds of applications by means of external packaging such as a resin mold, resin casing, metallic external casing, resin dipping and laminate film.

In addition, when the other electrode is a liquid, the capacitor constructed of both the above electrodes and the dielectric material may be, for example, housed in a can which is electrically connected to the other electrode to form a capacitor. In this case, the capacitor is designed such that the electrode side of the porous anode is led out through the niobium or tantalum lead and that the electrode being insulated from the can with insulating rubber or the like.

As described above, porous anodes for capacitors (anode for a capacitor) of valve-acting metals, valve-acting metal alloys and valve-acting metal compounds, manufactured according to the embodiments of the present invention, have effects in particular on improving property for impregnation with the cathode agent which is provided as the other electrode. By producing a capacitor with the anode, it is possible to attain high capacitance, low ESR and low tan δ, whereby a capacitor having good long-term reliability with a small leakage current can be obtained.

The capacitor of the present invention enables production of capacitor product smaller in size with a larger electrostatic capacitance than that of the conventional capacitor for its volume. In addition, as described above, by using 2 to 1,000 of thin porous anodes, small porous anodes and/or thin porous anodes integrated with substrates to thereby prepare a capacitor where the anode leads extending from the respective anodes are arranged electrically in parallel, ESR of the capacitor can be further lowered.

The capacitor of the present invention having those characteristics can be applied not only in a bias capacitor or a coupling capacitor which can be used frequently in an analog or digital circuit but also in other normal capacitor. In particular, the capacitor of the present invention, which has a high capacitance and low ESR, can be preferably used for a circuit working at high frequency such as CPU and IC.

Since such a kind of capacitor is used frequently in any one of electronic circuits, the use of the capacitor of the present invention will alleviate limitation on the arrangement of electronic parts and exhaust heat system and therefore an electronic circuit having high reliability can be housed in a smaller space as compared with conventional capacitors.

Furthermore, using the capacitor of the present invention enables production of smaller and more reliable electronic devices than conventional ones including: computer peripherals such as hard-disc drive, digital video drive, mother board and PC card; mobile devices such as cellular phones; electrical appliance such as digital video recorder and a game console; on-board equipment such as navigation; artificial satellite; and other communication devices.

EXAMPLES

Hereinafter, the present invention will be explained specifically with reference to Examples and Comparative Examples. However, the present invention is not limited to those examples. Here, a tapping density, angle of repose, particle size, pore diameter, capacitance of a capacitor, leakage current, appearance of capacitance, and moisture resistance in each example were measured by means of the following methods.

In addition, a capacitor was obtained from the sintered body of each of Examples and Comparative Examples by means of any one of the following methods 1 to 4.

Method of Manufacturing Capacitor 1:

A porous anode made of a valve-acting metal was prepared such that a dielectric material oxidized film was formed on the surface by electrolytic oxidation with an aqueous 0.1% phosphoric acid solution at a voltage of 20 V. Then, it was dipped into a 60% manganese nitrate aqueous solution, followed by heating at 220° C. for 30 minutes, and then the operation was repeated, thereby forming a manganese dioxide layer as a counter electrode layer on the dielectric material oxidized film. Subsequently, a carbon layer and a silver paste layer were laminated sequentially and then a lead frame was mounted, followed by sealing the whole with an epoxy resin to thereby make a chip-type capacitor.

Method of Manufacturing Capacitor 2:

A porous anode made of a valve-acting metal was prepared such that a dielectric material oxidized film was formed on the surface by electrolytic oxidation with an aqueous 0.1% phosphoric acid solution at a voltage of 20 V. Then, it was dipped into a 1:1 (volume ratio) mixture solution of a 35% lead acetate aqueous solution and a 35% ammonium persulfate aqueous solution to allow a reaction at 40° C. for 1 hour, and then the reaction was repeated, thereby forming a mixture layer of lead dioxide and lead sulphate as a counter electrode layers on the dielectric material oxidized film. Subsequently, a carbon layer and a silver paste layer were laminated sequentially and then a lead frame was mounted, followed by sealing the whole with an epoxy resin to thereby produce a chip-type capacitor.

Method of Manufacturing Capacitor 3:

A porous anode made of a valve-acting metal was prepared such that a dielectric material oxidized film was formed on the surface by electrolytic oxidation with an aqueous 0.1% phosphoric acid solution at a voltage of 20 V. Next, on the dielectric material oxidized film, a mixture solution of the equal amounts of a 10% aqueous solution of ammonium persulfate and a 0.5% aqueous solution of anthraquinone sulfonic acid was contacted. After that, an operation of contacting with pyrrole vapor was repeated at least 5 times to thereby form a counter electrode made of polypyrrole. Subsequently, a carbon layer and a silver paste layer were laminated sequentially and then a lead frame was mounted, followed by sealing the whole with an epoxy resin to thereby produce a chip-type capacitor.

Method of Manufacturing Capacitor 4:

A porous anode made of a valve-acting metal was prepared such that a dielectric material oxidized film was formed on the surface by electrolytic oxidation with an aqueous 0.1% phosphoric acid solution at a voltage of 20 V. Next, it was dipped into an aqueous solution containing 25% by mass of ammonium persulfate (solution 1) and then pulled up, followed by drying for 30 minutes at 80° C. Subsequently, after having been dipped in an isopropanol solution containing 18% by mass of 3,4-ethylenedioxy thiophene (solution 2), it was pulled up and left standing for 10 minutes at atmospheric temperature of 60° C. to carry out oxidation polymerization. It was dipped again into the solution 1 and then subjected to the same treatment as described above. An operation from dipping into the solution 1 to the oxidation polymerization was repeated 8 times, followed by washing with hot water at 50° C. for 10 minutes. Then, it was dried at 100° C. for 30 minutes. Thus, a counter electrode made of conductive poly (3,4-ethylenedioxy thiophene) was formed. Subsequently, a carbon layer and a silver paste layer were laminated sequentially and then a lead frame was mounted, followed by sealing-the whole with an epoxy resin, to thereby make a chip-type capacitor.

Method of Manufacturing Capacitor 5:

A porous anode made of a valve-acting metal was prepared such that a dielectric material oxidized film was formed on the surface by electrolytic oxidation with an aqueous 0.1% phosphoric acid solution at a voltage of 13V. Next, on the dielectric material oxidized film, a mixture solution of the equal amounts of a 10% aqueous solution of ammonium persulfate and a 0.5% aqueous solution of anthraquinone sulfonic acid was contacted. After that, an operation of contacting with pyrrole vapor was repeated at least 5 times to form a counter electrode made of polypyrrole. Subsequently, a carbon layer and a silver paste layer were laminated sequentially and then a lead frame was mounted, followed by sealing the whole with an epoxy resin to thereby produce a chip-type capacitor.

Method of Manufacturing Capacitor 6:

A porous anode made of a valve-acting metal was prepared such that a dielectric material oxidized film was formed on the surface by electrolytic oxidation with an aqueous 0.1% phosphoric acid solution at a voltage of 13 V. Next, it was dipped into an aqueous solution containing 25% by mass of ammonium persulfate (solution 1) and then pulled up, followed by drying for 30 minutes at 80° C. Subsequently, after having been dipped in an isopropanol solution containing 18% by mass of 3,4-ethylenedioxy thiophene (solution 2), it was pulled up and left standing for 10 minutes at atmospheric temperature of 60° C. to carry out oxidation polymerization. It was dipped again into the solution 1 and then subjected to the same treatment as described above. An operation from dipping into the solution 1 to the oxidation polymerization was repeated 8 times, followed by washing with hot water at 50° C. for 10 minutes. Then, it was dried at 100° C. for 30 minutes. Thus, a counter electrode made of conductive poly (3,4-ethylenedioxy thiophene) was formed. Subsequently, a carbon layer and a silver paste layer were laminated sequentially and then a lead frame was mounted, followed by sealing the whole with an epoxy resin to thereby produce a chip-type capacitor.

Example 1

A mixture powder having an average particle size of 120 µm, which contains 80 parts by mass of niobium powder having an average particle size of 0.5 µm, containing 12% by mass of oxygen; 10 parts by mass of calcium oxide having an average particle size of 0.9 µm; and 10 parts by mass of calcium oxide having an average particle size of 2 µm, was prepared.

In a solution prepared by dissolving 40 g of camphor into 1 liter of toluene, 900 ml of the mixture powder having an average particle size of 120 µm and 100 ml of calcium oxide having an average particle size of 30 µm were added and mixed well. Then, toluene was distilled off at about 60° C. under reduced pressure of about $1 \times 10^2$ Pa, thereby obtaining a mixture powder containing niobium, calcium oxide, and camphor. Furthermore, this mixture powder was automatically molded together with a niobium wire of 0.3 mm in diameter so as to be one approximately measuring 3.3 mm×1.8 mm×4.3 mm (about 25 mm$^3$). The niobium-corrected density of the molded body was 2.8 g/ml. The camphor was removed from the molded body by heating at 250 to 400° C. at a pressure of $10^{-2}$ to $10^2$ Pa. Then, the molded body was left standing at 1,150° C. for 45 minutes under a reduced pressure of $4 \times 10^{-3}$ Pa to sinter the molded body, followed by cooling the molded body down to a temperature of 30° C. or lower. Consequently, a sintered body made of niobium and calcium oxide, containing oxygen and having a niobium lead wire was obtained. The niobium-corrected density of the molded body of the mixture was 3.3 g/ml. 1,000 molded bodies (about 90 g) of the mixture were well mixed with 15 g of chip-shaped metal magnesium, and then placed in a niobium tray. Furthermore, a plate made of niobium was covered on the upper portion of the tray (but not sealed up) and then placed in a reduction reaction vessel. After reducing the pressure in the reaction vessel, an operation of introducing argon into the reaction vessel was repeated three times or more and then substituted the air in the reaction vessel with argon. After adjusting the pressure in the reaction vessel to about $5 \times 10^4$ Pa (about 400 mmHg), the temperature of the reaction vessel was heated up to 400° C. at a temperature-rising rate of about 12° C./minute. The mixture was left standing at about 400° C. for 30 minutes and heated up to 450° C. at a temperature-rising rate of about 10° C./minute and then left standing at about 450° C. for 30 minutes. The mixture was heated up to 500° C. at a temperature-rising rate of about 8° C./minute and then left standing at about 500° C. for 30 minutes. The mixture was heated up to 550° C. at a temperature-rising rate of about 8° C./minute and then left standing at about 550° C. for 30 minutes. The mixture was heated up to 600° C. at a temperature-rising rate of about 8° C./minute and then left standing at about 600° C. for 30 minutes. The mixture was heated up to 650° C. at a temperature-rising rate of about 8° C./minute and then left standing at about 650° C. for 30 minutes. The mixture was heated up to 700° C. at a temperature-rising rate of about 8° C./minute and then left standing at about 700° C. for 30 minutes. The mixture was heated up to 730° C. at a temperature-rising rate of 6° C./minute and then left standing at about 730° C. for 5 hours, followed by cooling down to room temperature. During the operation from heating to cooling, an operation of reducing or increasing the pressure in the reaction vessel (removing argon from the reaction vessel or enclosing argon in the reaction vessel) was appropriately carried out such that the pressure was kept within a range of about $4 \times 10^4$ to $8 \times 10^4$ Pa (about 300 to 600 mmHg). The pressure inside the reaction vessel was reduced to a pressure of about $5 \times 10^4$ Pa (about 400 mmHg), and nitrogen containing 0.5% by mass of oxygen was added thereto in a manner that the temperature of the reduction reaction product did not exceed 40° C. The pressure inside the reaction vessel was reduced to about $5 \times 10^4$ Pa (about 400 mmHg), and then nitrogen containing oxygen was then added. These procedures (slow oxidation) were repeated until the temperature rising of the reduction reaction product stopped. At this step, the oxygen content in the nitrogen used for the slow oxidation was gradually raised to 0.5% by mass, 1% by mass, 1.5% by mass, 2% by mass, 2.5% by mass, 3% by mass, 5% by mass, 10% by mass, and 15% by mass. Finally, the air (atmosphere) was introduced therein and left standing for about 12 hours, followed by taking out a niobium molded body from the reaction vessel. In 3 litters of a mixture aqueous solution containing 20% by mass of nitric acid and 1.5% by mass of hydrogen peroxide which solution was separately prepared, the niobium molded body was immersed while stirring and cooling the mixture solution so as to prevent the temperature of the aqueous mixture solution from exceeding 40° C. After immersing the molded body for about 2 hours, the niobium molded body was taken out. Further, in 3 litters of a mixture aqueous solution containing 20% by mass of nitric acid and 1.5% by mass of hydrogen peroxide, the niobium molded body was immersed for 12 hours while stirring and cooling the mixture solution so as to prevent the temperature of the aqueous mixture solution from exceeding 40° C., to thereby dissolve calcium oxide as the pore-forming agent, magnesium oxide as the reduction reaction product and metal magnesium as the unreacted reducing agent. Subsequently, decantation was carried out and the niobium molded body was then taken out and placed into a column made of polytetrafluoroethylene. Ion-exchanged water was allowed to flow through the column to conduct washing for 12 hours, thereby removing calcium salt, magnesium salt, nitric acid and hydrogen peroxide. In this case, the electric conductivity of rinse water was 0.9 µS/cm.

The molded body was dried at about 50° C. under a reduced pressure of about 1×10² Pa, followed by cooling the molded body to a product temperature of 30° C. or lower. A nitrogen gas containing 0.5% by mass of oxygen was added to the mixture while keeping the product temperature less than 40° C., and a drying machine was depressurized and then nitrogen containing oxygen was added again. Such an operation of slow oxidation was repeated until the product temperature stopped changing and then left standing for 8 hours or more, thereby obtaining a porous niobium molded body in which a niobium lead was planted. The niobium molded body had an oxygen content of 2.4% by mass, and was about 22 mm³ in volume and 3.3 g/ml in density. The specific surface area was 0.023 m²/mm³. Furthermore, the pore ratio was 61%, and there were pore diameter peak tops at about 0.9 μm, about 2 μm, and about 30 μm, respectively. The volume of the pores of 1 μm or more was 18% by volume.

Next, 100 niobium molded bodies were prepared and subjected to electrolytic formation at a voltage of 20 V using a 0.1% aqueous solution of phosphoric acid to form a dielectric material oxide film on the surfaces of niobium molded bodies, which were provided as porous niobium anodes.

For the niobium anode, using the same method as the manufacturing method 4 of the capacitor, a chip-type capacitor was prepared. The capacitor had a capacitance appearance ratio of 99%, average capacitance of 991 μF/capacitor and average ESR value of 18 mΩ.

Example 2

A mixture powder having an average particle size of 90 μm, which contains 70 parts by mass of niobium powder having an average particle size of 0.5 μm, containing 15% by mass of oxygen; 15 parts by mass of barium oxide having an average particle size of 0.7 μm; and 15 parts by mass of barium oxide having an average particle size of 2 μm, was prepared.

In a solution prepared by dissolving 40 g of camphor into 1 litre of toluene, 900 ml of the mixture powder having an average particle size of 90 μm and 100 ml of barium oxide having an average particle size of 20 μm were added and mixed well. Then, toluene was distilled off at about 60° C. under reduced pressure of about 1×10² Pa, thereby obtaining a mixture powder containing niobium, barium oxide, and camphor. Furthermore, this mixture powder was automatically molded together with a niobium wire of 0.20 mm in diameter so as to be one approximately measuring 0.4 mm×1.8 mm×4.3 mm (about 3.1 mm³). The niobium-corrected density of the molded body was 2.8 g/ml. The camphor was removed from the molded body by heating at 250 to 400° C. at a pressure of 10⁻² to 10² Pa. Then, the molded body was left standing at 1,165° C. for 30 minutes under a reduced pressure of 4×10⁻³ Pa to sinter the molded body, followed by cooling the molded body down to a temperature of 30° C. or lower. Consequently, a sintered body made of niobium and barium oxide, containing oxygen and having a niobium lead wire was obtained. The niobium-corrected density of the mixture was 3.4 g/ml.

A reaction vessel having a structure for allowing gas to circulate from the lower part to the upper part was prepared. Chip-shaped metal magnesium was placed in a tray made of niobium and then placed in the lower part of the reaction vessel. 10,000 molded bodies (each about 12.4 mg without a lead rod, thus about 124 g in total) were placed on a wire sheet made of niobium and then the wire sheet was placed on the middle part of the reaction vessel.

The reaction vessel was depressurized to about 1×10² Pa, and then argon was introduced into the reaction vessel, followed by returning to normal pressure. Such a kind of operation was repeated three times or more to substitute the air in the reaction vessel with argon. Argon was allowed to circulate from the lower part to the upper part of the reaction vessel at a rate of 50 ml/minute. While adjusting the inner pressure of the reaction vessel to about 9.0×10⁴ Pa to about 1.2×10⁵ Pa (about 700 to 900 mmHg), the reaction vessel was heated up to 500° C. at a temperature-rising rate of 12° C./minute. After left standing at about 500° C. for 30 minutes, the reaction vessel was heated up to 550° C. at a temperature-rising rate of 10° C./minute. After left standing at about 550° C. for 30 minutes, the reaction vessel was heated up to 600° C. at a temperature-rising rate of 8° C./minute. After left standing at about 600° C. for 30 minutes, the reaction vessel was heated up to 650° C. at a temperature-rising rate of 8° C./minute. After left standing at about 650° C. for 30 minutes, the reaction vessel was heated up to 700° C. at a temperature-rising rate of 8° C./minute. After left standing at about 700° C. for 30 minutes, the reaction vessel was heated up to 730° C. at a temperature-rising rate of 6° C./minute, followed by left standing at about 730° C. for 8 hours. Subsequently, it was cooled down to room temperature while the flow rate of argon was controlled so as to keep the inner pressure of the reaction vessel at about 9.0×10⁴ Pa to about 1.2×10⁵ Pa (about 700 to 900 mmHg). The flow of argon was terminated and the pressure of the reaction vessel was reduced to about 5×10⁴ Pa (about 400 mmHg), followed by repeating the slow oxidation operation as shown in Example 1 until an increase in temperature of a reactant could not be observed. Then, at room temperature, after left standing for 12 hours, the niobium molded body was taken out from the reaction vessel. In 3 litres of aqueous mixture solution containing 20% by mass of nitric acid and 1.5% by mass of hydrogen peroxide which solution was separately prepared, the niobium molded body was immersed while cooling and stirring so as to prevent the temperature of the aqueous mixture solution from exceeding 40° C. After immersing for about 2 hours, the niobium molded body was taken out and then immersed into an aqueous mixture solution (3 litres) containing 20% by mass of nitric acid and 1.5% by mass of hydrogen peroxide for about 12 hours while cooling and stirring so as to prevent the temperature of the mixture solution from exceeding 40° C., to thereby dissolve barium oxide as the pore-forming agent, magnesium oxide as the reduction reaction product and metal magnesium as the unreacted reducing agent in the mixture solution. After that, the mixture solution was decanted to collect the niobium molded body, and the niobium molded body was placed in a column made of polytetrafluoroethylene. Ion-exchanged water was allowed to flow through the column to conduct washing for 12 hours, to thereby remove barium salt, magnesium salt, nitric acid and hydrogen peroxide from the column. In this case, the electric conductivity of rinse water was 0.7 μS/cm.

The molded body was dried at about 50° C. under a reduced pressure of about 1×10² Pa, followed by cooling the molded body to a product temperature of 30° C. or lower. A nitrogen gas containing 0.5% by mass of oxygen was added to the mixture while keeping the product temperature less than 40° C., and a drying machine was depressurized and then nitrogen containing oxygen was added again. Such an operation of slow oxidation was repeated until the product temperature stopped changing and then left standing for 8 hours, thereby obtaining a porous niobium molded body in which a niobium lead was planted.

The niobium molded body had an oxygen content of 1.8% by mass, and was about 2.6 mm³ in volume, and 3.4 g/ml in density. The specific surface area was 0.024 m²/mm³. Furthermore, the pore ratio was 60%, and there were pore diameter peak tops at about 0.7 μm, about 2 μm, and about 20 μm, respectively. The volume of the pores of 1 μm or more is 17% by volume.

Next, 600 niobium molded bodies were prepared and subjected to electrolytic formation at a voltage of 20 V using a 0.1% aqueous solution of phosphoric acid to form a dielectric material oxide film, which was provided as a niobium anode. For the niobium anode, using the same method as the manufacturing method 3 of the capacitor, a conductive polymer layer, a carbon paste layer and a silver paste layer were laminated one after another. Six niobium anodes were used and laminated as shown in FIGS. 2 and 3, and leading lines were spot-welded on a bar made of copper, whereby an anode unit comprising a series of 6 anode bodies combined was prepared. Furthermore, for each of 100 units of such an anode body, after an additional silver paste layer was laminated and then a lead frame was placed thereon, the whole was sealed with an epoxy resin, to thereby produce a chip-type capacitor. Thus produced capacitors had a capacitance appearance ratio of 99%, average capacitance of 749 μF/capacitor and average ESR of 4 mΩ.

Example 3

A mixture powder which contains 90 parts by mass of niobium powder having an average particle size of 0.5 μm, containing 9% by mass of oxygen; 6 parts by mass of magnesium hydroxide having an average particle size of 0.7 μm; and 10 parts by mass of magnesium hydroxide having an average particle size of 2 μm, was prepared.

A slurry liquid was prepared by adding 900 ml of a mixture powder having an average particle size of 90 μm and 100 ml of magnesium hydroxide having an average particle size of 10 μm to a solution prepared by dissolving 40 g of camphor in 1 litter of toluene and stirring the mixture well. Next, a mask having a thickness of 0.2 mm and having a plurality of openings in a lattice-like pattern for the formation of a powder-sintering layer of 3.3 mm×4.3 mm was mounted on a niobium foil having a thickness of 50 μm. Subsequently, the slurry liquid was applied onto the surface of the lattice-shaped mask while being discharged from a die-coating mold attached on the tip of a dispenser, thereby forming a slurry layer on a niobium foil. The slurry layer was hot-air dried at about 60° C. The niobium foil was reversed and then had a mask having the same shape placed thereon as described above so that the front and back surfaces can be symmetrical with each other. The slurry liquid was applied onto the lattice-shaped surface of the mask while being discharged from the die-coating mold attached on the tip of the dispenser, to form a slurry layer on the niobium foil, followed by hot-air drying at about 60° C. After removing both masks on the front and back, it was heated at 250 to 400° C. at a pressure of $10^{-2}$ to $10^2$ Pa to remove camphor and hydrogen and then left standing at 1,170° C. for 30 minutes under a reduced pressure of $4×10^{-3}$ Pa to carry out sintering, followed by cooling down to a product temperature of 30° C. or lower. Consequently, island-like laminates formed of mixture layers of oxygen-containing niobium and magnesium oxide (hereinafter simply referred to as "mixture layer") on corresponding positions of the both surfaces of the niobium foil were obtained. With respect to each of the laminates (i.e. mixture layer/niobium foil/mixture layer), the three sides around the mixture layer were cut with the other one side remained uncut to serve as a leading line made only of the niobium foil, whereby the respective molded bodies were obtained.

Next, a reaction vessel having a structure for allowing gas to circulate from the lower part to the upper part was prepared. Chip-shaped metal magnesium was placed in a tray made of niobium and then placed in the lower part of the reaction vessel. 10,000 molded bodies (each about 12.4 mg without a lead rod, thus about 124 g in total) was placed on a wire sheet made of niobium and then the wire sheet was placed on the middle part of the reaction vessel.

The reaction vessel was depressurized at about $1×10^2$ Pa, and then argon was introduced into the reaction vessel, followed by returning to normal pressure. Such a kind of operation was repeated three times or more to substitute the air in the reaction vessel with argon. Argon was allowed to circulate from the lower part to the upper part of the reaction vessel at a rate of 50 ml/minute. While adjusting the inner pressure of the reaction vessel to about $9.0×10^4$ Pa to about $1.2×10^5$ Pa (about 700 to 900 mmHg), the reaction vessel was heated up to 600° C. at a temperature-rising rate of 10° C./minute. After left standing at about 600° C. for 30 minutes, the reaction vessel was heated up to 650° C. at a temperature-rising rate of 8° C./minute. After left standing at about 650° C. for 30 minutes, the reaction vessel was heated up to 700° C. at a temperature-rising rate of 8° C./minute. After left standing at about 700° C. for 30 minutes, the reaction vessel was heated up to 730° C. at a temperature-rising rate of 6° C./minute. After left standing at about 730° C. for 8 hours. Subsequently, it was cooled down to room temperature while the flow rate of argon was controlled so as to keep the inner pressure of the reaction vessel within a range of about $9.0×10^4$ Pa to about $1.2×10^5$ Pa (about 700 to 900 mmHg). The flow of argon was terminated and the pressure of the reaction vessel was reduced to about $5×10^4$ Pa (about 400 mmHg), followed by repeating the slow oxidation operation as shown in Example 1 until an increase in temperature of a reactant could not be observed. Then, at room temperature, after left standing for 12 hours, a niobium molded body was taken out from the reaction vessel. In additional 3-litter aqueous mixture solution containing 20% by mass of nitric acid and 1.5% by mass of hydrogen peroxide, the niobium molded body was immersed while cooling and stirring so as to prevent the temperature of the aqueous mixture solution from exceeding 40° C. After immersing for about 2 hours, the niobium molded body was taken out and then immersed in an aqueous mixture solution (3 litters) containing 20% by mass of nitric acid and 1.5% by mass of hydrogen peroxide for about 12 hours while cooling and stirring in a manner that the temperature of the mixture solution did not exceed 40° C., to thereby dissolve magnesium hydroxide as the pore-forming agent, magnesium oxide as the reduction reaction product and metal magnesium as the unreacted reducing agent in the mixture solution. After that, the mixture solution was decanted to collect the niobium molded body, and the niobium molded body was placed in a column made of polytetrafluoroethylene. Ion-exchanged water was allowed to flow through the column to conduct washing for 12 hours, thereby removing magnesium salt, nitric acid, and hydrogen peroxide from the column. In this case, the electric conductivity of rinse water was 0.7 μS/cm. The molded body was dried at about 50° C. under a reduced pressure of about $1×10^2$ Pa, followed by cooling the molded body until a product temperature became 30° C. or lower. A nitrogen gas containing 0.5% by mass of oxygen was added to the mixture while keeping the product temperature less than 40° C., and a drying machine was depressurized and then nitrogen containing oxygen was added again. Such an operation of slow oxidation was repeated until the product temperature stopped changing and then left standing for 8 hours or more, to thereby obtain a porous niobium molded body having a niobium foil as a substrate.

The niobium molded body had an oxygen content of 1.3% by mass, and was about 2.8 mm$^3$ in volume, and 3.4 g/ml in density. The specific surface area was 0.021 m$^2$/mm$^3$. Furthermore, the pore volume was 60%, and there were pore diameter peak tops at about 0.7 μm, about 2 μm, and about 10 μm, respectively. The volume of the pores of 1 μm or more was 16% by volume.

Next, 300 of the niobium molded bodies were prepared and each was subjected to electrolytic formation at a voltage of 20 V using a 0.1% aqueous solution of phosphoric acid to form a dielectric material oxide film, whereby a niobium anode was prepared. For the niobium anode, using the same method as in the manufacturing method 4 of the capacitor, a conductive polymer layer, a carbon paste layer and a silver paste layer were laminated one after another. Three niobium anodes were used and laminated as shown in FIGS. 4 and 5, and leading lines made of niobium foil and copper-made spacers of a thickness of about 400 μm were welded together, to thereby obtain a niobium anode unit comprising a series of 3 niobium anodes combined. Furthermore, for each of the 100 anode units, after an additional silver paste layer was laminated and then a lead frame was welded thereon, the whole was sealed with an epoxy resin, to thereby produce a chip-type capacitor. Thus produced capacitors had a capacitance appearance ratio of 99%, average capacitance of 724 μF/capacitor and average ESR value of 6 mΩ.

Example 4

A mixture powder having an average particle size of 140 μm, which contains 84 parts by mass of tantalum powder having an average particle size of 0.5 μm, containing 8% by mass of oxygen; 8 parts by mass of barium oxide having an average particle size of 0.7 μm; and 8 parts by mass of barium oxide having an average particle size of 2 μm, was prepared.

In a solution prepared by dissolving 40 g of camphor into 1 litter of toluene, 900 ml of the mixture powder having an average particle size of 140 μm and 100 ml of barium oxide having an average particle size of 20 μm were added and mixed well. Then, toluene was distilled off at about 60° C. under reduced pressure of about 1×10$^2$ Pa, thereby obtaining a mixture powder containing tantalum, barium oxide, and camphor. Furthermore, this mixture powder was automatically molded together with a tantalum wire of 0.20 mm in diameter so as to be one approximately measuring 0.4 mm×1.8 mm×4.3 mm (about 3.10 mm$^3$). The tantalum-corrected density of the molded body was 5.0 g/ml. The camphor was removed from the molded body by heating at 250 to 400° C. at a pressure of 10$^{-2}$ to 10$^2$ Pa. Then, the molded body was left standing at 1,300° C. for 30 minutes under a reduced pressure of 4×10$^{-3}$ Pa to sinter the molded body, followed by cooling the molded body down to a temperature of 30° C. or lower. Consequently, sintered body made of tantalum and barium oxide, containing oxygen and having a tantalum lead wire was obtained. The tantalum-corrected density of the mixture was 5.7 g/ml. Hereinafter, the reduction reaction and the removal of a pore-forming agent were carried out using the same method as in Example 2, to thereby obtain a porous tantalum molded body in which a tantalum lead was planted.

The tantalum molded body had an oxygen content of 0.9% by mass, and was about 2.6 mm$^3$ in volume, and 5.7 g/ml in density. The specific surface area was 0.026 m$^2$/mm$^3$. Furthermore, the pore ratio was 66%, and there were pore diameter peak tops at about 0.7 μm, about 2 μm, and about 20 μm, respectively. The volume of the pores of 1 μm or more was 18% by volume.

Next, 600 of the tantalum molded bodies were prepared and each was subjected to electrolytic formation at a voltage of 20 V using a 0.1% aqueous solution of phosphoric acid to form a dielectric material oxide film on the surface, whereby a tantalum anode was prepared. For the tantalum anode, using the same method as in the manufacturing method 1 of the capacitor, an inorganic semiconductor layer, a carbon paste layer and a silver paste layer were laminated one after another. Six tantalum anodes were used and laminated as shown in FIGS. 2 and 3 and leading lines were spot-welded on a bar made of copper, to thereby obtain a tantalum anode units comprising a series of six tantalum anodes combined. Furthermore, for each of 100 anode units, after an additional silver paste layer was laminated and then a lead frame was placed thereon. After that, the whole was sealed with an epoxy resin, to thereby produce a chip-type capacitor. Thus produced capacitors had a capacitance appearance ratio of 99%, average capacitance of 728 μF/capacitor and average ESR value of 18 mΩ.

Example 5

Using the same method as that of Example 1, a molded body constructed of the oxygen-containing niobium and calcium oxide (pore-forming agent) was prepared and subjected to a reduction reaction. After completing the reaction, the molded body was cooled to room temperature and then subjected to slow oxidation. The molded body composed of niobium and the pore-forming agent was subjected to nitriding at 330 to 370° C. for 2 hours under nitrogen atmosphere. The rate of nitriding was 0.2% by mass. The nitrided molded body was subjected to the same method as that of Example 1, where the steps of, for example, dissolving and removing oxide from a pore-forming agent, an unreacted reducing agent, and a reducing agent were carried out successively, followed by washing with water. Therefore, the porous niobium molded body on which a niobium lead was planted was obtained. The porous niobium molded body had an oxygen content of 3.2% by mass, a volume of 22 mm$^3$, a density of 3.3 g/ml, and a specific surface area of 0.024 m$^2$/mm$^3$. In addition, the pore ratio was 61%, and there were pore diameter peak tops at 0.9 μm and 2.2 μm, respectively. The volume of the pores of 1 μm or more in diameter was 18% by volume.

The niobium molded body was employed to prepare a chip-type capacitor according to the capacitor manufacturing method 3. The capacitance appearance ratio of the capacitor was 99% in average. The average capacitance was 983 μF/capacitor and the average ESR was 18 mΩ.

Example 6

Using the same method as that of Example 3, a molded body having a mixture layer of niobium containing 9% by mass of oxygen and magnesium oxide on a niobium foil was obtained. Next, the reduction reaction, the removal of pore-forming agents, and washing or the like were performed successively, thereby obtaining a porous niobium molded body having a niobium foil as a substrate. The molded body was subjected to nitriding at 370 to 420° C. for 2 hours under nitrogen atmosphere. The rate of nitriding was 0.4% by mass. The porous niobium molded body had an oxygen content of 0.9% by mass, a volume of about 2.8 mm$^3$, and a density of 3.4 g/ml, and a specific surface area of 0.022 m$^2$/mm$^3$. In addition, the pore content was 60%, and there were pore diameter peak tops at about 0.7 µm, about 2 µm, and about 10 µm, respectively. The volume of the pores of 1 µm or more in diameter was 17% by volume. Hereinafter, in the same manner as in the capacitor manufacturing method 4 and according to the same method as that of Example 3, a chip-type capacitor was prepared. The capacitor had a capacitance appearance ratio of 99%. The average capacitance was 735 µF/capacitor and the average ESR was 6 mΩ.

Example 7

Using the same method as that of Example 3, a molded body having a mixture layer of niobium containing 26% by mass of oxygen (a mixture of niobium pentoxide and niobium dioxide) and magnesium oxide on a niobium foil was obtained and then reduction reaction, the removal of pore-forming agents, washing, and so on were carried out successively, to thereby obtain a porous niobium molded body having a niobium foil as a substrate. The porous niobium molded body had an oxygen content of 14.6% by mass, a volume of about 2.8 mm$^3$, and a density: an apparent density including a niobium foil of 3.4 g/ml (niobium conversion density: porous density 2.5 g/ml), and a specific surface area of 0.025 m$^2$/mm$^3$. In addition, the pore ratio was 60%, and there were pore diameter peak tops at about 0.7 µm, about 2 µm, and about 10 µm, respectively. The volume of the pores of 1 µm or more in diameter was 17% by volume. Hereinafter, in the same manner as in the capacitor manufacturing method 4 and according to the same method as that of Example 3, a chip-type capacitor was prepared. The capacitor had a capacitance appearance ratio of 99%. The average capacitance was 743 µF/capacitor and the average ESR was 7 mΩ.

Examples 8 to 23

Niobium powders having different oxygen contents and different other components were prepared. Other components included in each of the niobium powders were those molten and alloyed when an ingot as a raw material was prepared. In addition, in a case where tantalum and nitrogen were to be contained, tantalum nitride was added (Example 21), and in a case where silicon and nitrogen were to be contained, silicon nitride was added (Example 23). By using the pore-forming agents and reducing agents shown in Table 1, in the same manner as in Example 2, porous niobium molded bodies on which niobium leads were planted were obtained. Their physical properties are shown in Table 3. Furthermore, by using any of the capacitor manufacturing methods 1 to 4, a cathode layer, a carbon paste layer, and a silver paste layer were laminated successively. In the same manner as in Example 2, a series of 6 niobium anodes was prepared and then a chip-type capacitor was prepared in the same manner as in Example 2. The physical properties of the porous niobium molded bodies and capacitors are shown in Table 3, respectively.

Examples 24 to 27

Niobium powders having different oxygen contents were prepared. Using pore-forming agents and reducing agents as shown in Tables 1 and 2, in Examples 24 and 26, porous niobium molded bodies having different shapes and sizes were prepared by the same method as that of Example 1. Besides, chip-type capacitors were prepared by the same method as the capacitor manufacturing method 4.

In Examples 25 and 27, anode leads of three of the molded bodies prepared in Examples 24 and 26 were connected and then chip-type capacitors were prepared by the same method as the capacitor manufacturing method 4. Their physical properties are shown in Tables 3 and 4, respectively.

Example 28

In Example 28, a porous niobium molded body was prepared such that only one side of the substrate was applied by the method of Example 3. In the same manner as in the capacitor manufacturing method 4, after impregnation of a cathode agent, six layers were laminated one after another to prepare a chip-type capacitor by the same method as that of Example 3. The physical properties of the capacitor are shown in Table 4.

Examples 29 to 31

In Examples 29 to 31, in the same manner as in Example 2, porous niobium molded bodies were prepared without providing niobium leads and then niobium leads were welled, respectively. Then, in the same manner as in the capacitor manufacturing method 4, chip-type capacitors were prepared. The physical properties of the capacitors are shown in Table 4, respectively.

Examples 32 to 33

In Examples 32 to 33, in the same manner as in Example 2, porous niobium molded bodies were prepared without providing niobium leads and then different niobium lead having different shapes were welled, respectively. Then, in the same manner as in the capacitor manufacturing method 4, the impregnation of cathode agents was carried out. Subsequently, six layers were laminated one after another to prepare a chip-type capacitor by the same method as that of Example 2. The physical properties of the capacitors are shown in Table 4, respectively.

Example 34

A mixture powder having an average particle size of 120 µm, which contains: 90 parts by mass of hydrogenated niobium powder having an average particle size of 0.5 µm, containing 12% by mass of oxygen; 6 parts by mass of magnesium oxide having an average particle size of 0.7 µm; and 10 parts by mass of magnesium oxide having an average particle size of 2 µm, was prepared.

In a solution prepared by dissolving 40 g of camphor into 1 litter of toluene, 900 ml of the mixture powder having an average particle size of 120 µm and 100 ml of magnesium oxide having an average particle size of 30 µm were added and mixed well. Then, toluene was distilled off at about 60° C. under reduced pressure of about 1×10$^2$ Pa, thereby obtaining a mixture powder containing hydrogenated niobium, magnesium oxide, and camphor. Furthermore, this mixture powder was automatically molded together with a niobium wire of 0.3 mm in diameter so as to be one approximately 4.3 mm×2.4 mm×5.6 mm (about 57 mm$^3$). The niobium-corrected density of the molded body was 2.8 g/ml.

Using any of reducing agents shown in Table 2, the reduction reaction, the removal of a pore-forming agent, washing, and so on were carried out successively by the same method as that of Example 1, thereby obtaining a porous niobium molded body having a niobium lead planted thereon. The niobium molded body had an oxygen content of 3.0% by mass, a volume of 50 mm$^3$, a density of 3.4 g/ml, and a specific surface area of 0.024 m$^2$/g. In addition, the pore ratio was 61% and there were pore diameter peak tops at 0.9 µm, 2 µm, and 10 µm, respectively. Besides, the volume of the pores of 1 µm or more in diameter was 17% by volume. Next, in the same manner as in Example 1, electrolytic formation was carried out and a chip-type capacitor was then prepared using the capacitor manufacturing method 4. The physical properties of the capacitor are shown in Table 4.

Example 35

A mixture powder containing hydrogenated niobium, magnesium oxide, and camphor was prepared. Furthermore, this mixture powder was automatically molded together with a niobium wire of 0.3 mm in diameter so as to be one approximately 5.5 mm×3.0 mm×7.0 mm (about 115 mm$^3$). The niobium-corrected density of the molded body was 2.8 g/ml.

Using any of reducing agents shown in Table 2, the reduction reaction, the removal of a pore-forming agent, washing, and so on were carried out successively by the same method as that of Example 1, thereby obtaining a porous niobium molded body having a niobium lead planted thereon. The niobium molded body had an oxygen content of 3.5% by mass, a volume of 100 mm$^3$, a density of 3.3 g/ml, and a specific surface area of 0.023 m$^2$/g. In addition, the pore ratio was 60% and there were pore diameter peak tops at 0.9 µm, 2 µm, and 10 µm, respectively. Besides, the volume of the pore of 1 µm or more in diameter was 18% by volume. Next, a chip-type capacitor was prepared using the capacitor manufacturing method 4. The physical properties of the capacitor are shown in Table 4.

Examples 36 to 38

A porous niobium molded body was prepared by the same method as that of Examples 1 to 3, respectively. Chip-type capacitors were prepared using the capacitor manufacturing method 5. The physical properties of the capacitors are shown in Table 4.

Example 39

A porous niobium molded body was prepared by the same method as that of Example 1, except of using magnesium oxide instead of calcium oxide. Next, a chip-type capacitor was prepared using the capacitor manufacturing method 2. The physical properties of the capacitor are shown in Table 4.

Example 40

A porous niobium molded body was prepared by the same method as that of Example 1, except of using magnesium oxide instead of calcium oxide. Next, a chip-type capacitor was prepared using the capacitor manufacturing method 5. The physical properties of the capacitor are shown in Table 4.

Example 41

A porous niobium molded body was prepared by the same method as that of Example 1, except of using magnesium oxide instead of calcium oxide. Next, a chip-type capacitor was prepared using the capacitor manufacturing method 6. The physical properties of the capacitor are shown in Table 4.

Example 42

A niobium powder containing 6% by mass of oxygen and having an average particle size of 0.5 µm was prepared. Using any of pore-forming agents shown in Table 1, a mixture powder was obtained by the same method as that of Example 1. Furthermore, together with a niobium wire having a diameter of 0.3 mm, the mixture powder was automatically molded so as to be 3.3 mm×1.8 mm×4.3 mm (about 25 mm$^3$) in dimensions. Subsequently, in the same manner as in Example 1, camphor was removed and the sintering was then carried out to obtain molded body of niobium and magnesium oxide.

1,000 molded bodies of the mixture were added to a reaction vessel and then the pressure thereof was reduced to 4×10$^{-3}$ Pa. After that, H$_2$ gas (30 vol. %) diluted with Ar flowed through a reactor at a speed of 100 ml/minute. When the pressure reaches to a normal level, the temperature was increased to 400° C. at a temperature-rising rate of about 12° C./minute. After left standing at about 400° C. for 30 minutes, the reaction vessel was heated up to 450° C. at a temperature-rising rate of 10° C./minute, followed by left standing at about 450° C. for 30 minutes. The reaction vessel was heated up to 600° C. at a temperature-rising rate of 8° C./minute, followed by left standing at about 600° C. for 30 minutes. The reaction vessel was heated up to 700° C. at a temperature-rising rate of 8° C./minute, followed by left standing at about 700° C. for 30 minutes. Furthermore, the reaction vessel was heated up to 750° C. at a temperature-rising rate of 6° C./minute, followed by left standing at about 750° C. for 3 hours. After that, it was cooled down to room temperature. After completing the cooling, for removal of hydrogen as a reducing agent, the pressure of the reaction vessel was reduced to 4×10$^{-3}$ Pa and the pressure reduction with Ar was carried out to 5×10$^4$ Pa (about 400 mmHg), followed by carrying out slow oxidation by the same way as that of Example 1.

From the resulting niobium molded body, a pore-forming agent was removed by the same way as that of Example 1. Subsequently, using the capacitor manufacturing method 4, a chip-type capacitor was prepared.

The physical properties of the capacitor are shown in Table 4.

Example 43

Using magnesium oxide as a pore-forming agent, a niobium molded body was prepared by the same method as that of Example 1. After that, an excess amount of a reducing agent was removed by heating at 1,200° C. for 3 hours under reduced pressure (100 mmHg or less), followed by removal of the pore-forming agent by the same way as that of Example 1. Subsequently, using the capacitor manufacturing method 4, a chip-type capacitor was prepared.

The physical properties of the capacitor are shown in Table 4.

Comparative Example 1

A niobium powder containing 12% by mass of oxygen and having an average particle size of 0.5 µm in the absence of any pore-forming agent was prepared. The niobium powder was placed in a solution in which 40 g of camphor was dissolved in one litter of toluene and mixed well. The toluene was distilled from the mixture at about 60° C. under a reduced pressure of 1×10$^2$ Pa, thereby obtaining mixture powder containing both niobium and camphor. Furthermore, the mixture powder was automatically molded together with a niobium wire of 0.3 mm in diameter so as to be approximately 3.3 mm×1.8 mm×4.3 mm (about 25 mm$^3$) in dimensions. The molded body had a density in terms of niobium of 2.8 g/ml. The molded body was heated at 250 to 400° C. under 10$^{-2}$ to $10^2$ Pa to remove camphor, and then left standing at 1,150° C. for 45 minutes under a reduced pressure of $4 \times 10^{-3}$ Pa to carry out sintering. Subsequently, the molded body was cooled down to a product temperature of 30° C. or lower, thereby obtaining a niobium molded body containing oxygen and having a niobium lead. The molded body of the mixture had a density in terms of niobium of 3.3 g/ml. Subsequently, 1,000 molded bodies (about 90 g) of the mixture was mixed well with 15 g of chip-shaped metal magnesium and then placed in a niobium tray. Furthermore, a plate made of niobium was covered on the upper portion of the tray (but not sealed up) and then placed in a reduction reaction vessel. After reducing the pressure in the reaction vessel, an operation of introducing argon into the reaction vessel was repeated three times or more and then substituted the air in the reaction vessel with argon.

After adjusting the pressure in the reaction vessel in the same manner as in Example 1, the temperature thereof was increased to carry out a reduction reaction and then lowered to room temperature, followed by carrying out slow oxidation and taking out a niobium molded body.

By the same method as that of Example 1, a niobium molded body that contains magnesium oxide as a product of a reduction reaction and niobium containing unreacted metal magnesium was washed with an aqueous mixture solution containing 20% by mass of nitric acid and 1.5% by mass of hydrogen peroxide. Subsequently, using ion-exchange water, the molded body was further washed to remove magnesium salt, nitric acid, and hydrogen peroxide. At this time, the electric conductivity of rinse water was 0.9 μS/cm.

The molded body was dried under the conditions of a reduced pressure of about $1 \times 10^2$ Pa at a temperature of about 50° C., followed by cooling down until the product temperature reaches to 30° C. or lower. Nitrogen gas containing 0.5% by mass of oxygen was added while the product temperature was kept at 40° C. or lower. Subsequently, after reducing the pressure of a drying machine, an additional amount of nitrogen containing oxygen was added. Such a slow oxidation operation was repeated until no change in the product temperature can be found. Subsequently, the molded body was left standing for 8 hours or more, thereby obtaining a porous niobium molded body having a niobium lead planted. The niobium molded body had an oxygen content of 2.1% by mass, about 22 mm³ in volume, and 3.3 g/ml in density and 0.017 m²/mm³ in specific surface area. Furthermore, the pore ratio was 61%, and there was a pore diameter peak top only at about 0.5 μm. The volume of the pores of 1 μm or more was 5% by volume.

Next, 100 niobium molded bodies were prepared and then subjected to electrolytic formation at a voltage of 20 V using a 0.1% aqueous solution of phosphoric acid to form a dielectric material oxide film, thereby obtaining a niobium anode.

For the niobium anode, a chip-type capacitor was prepared using the capacitor manufacturing method 4. The capacitor had a capacitance appearance ratio of 85%, average capacitance of 628 μF/capacitor and average ESR value of 43 mΩ.

Comparative Example 2

A niobium powder containing 15% by mass of oxygen and having an average particle size of 0.5 μm in the absence of any pore-forming agent was prepared. The niobium powder was placed in a solution in which 40 g of camphor was dissolved in one litter of toluene and mixed well. The toluene was distilled from the mixture at about 60° C. under a reduced pressure of $1 \times 10^2$ Pa, thereby obtaining mixture powder containing both niobium and camphor. Furthermore, the mixture powder was automatically molded together with a niobium wire of 0.20 mm in diameter so as to be approximately 0.4 mm×1.8 mm×4.3 mm (about 3.1 mm³) in dimensions. The molded body had a density in terms of niobium of 2.8 g/ml. The molded body was heated at 250 to 400° C. under $10^{-2}$ to $10^2$ Pa to remove camphor, and then left standing at 1,165° C. for 30 minutes under a reduced pressure of $4 \times 10^{-3}$ Pa to carry out sintering. Subsequently, the molded body was cooled down to a product temperature of 30° C. or lower, thereby obtaining a niobium molded body containing oxygen and having a niobium lead. The molded body of the mixture had a density in terms of niobium of 3.3 g/ml.

The niobium molded body had an oxygen content of 2.0% by mass, a volume of about 2.6 mm³, and a density of 3.4 g/ml, and a specific surface area of 0.018 m²/mm³. Furthermore, the pore ratio was 60%, and there was a pore diameter peak top only at about 0.4 μm. The volume of the pores of 1 μm or more was 5% by volume.

Next, 600 niobium molded bodies were prepared and then subjected to electrolytic formation at a voltage of 20 V using a 0.1% aqueous solution of phosphoric acid to form a dielectric material oxide film, to thereby obtain niobium anode bodies. For the niobium anode bodies, using the same method as the capacitor manufacturing method 3, a conductive polymer layer, a carbon paste layer, and a silver paste layer were laminated successively. Six of the niobium anode bodies were arranged and then their leading lines were spot-welded on a bar made of copper. For each of 100 of niobium anode units comprising a series of six niobium anode bodies combined, a silver paste layer was further laminated. Subsequently, after mounting a lead frame thereon, the whole was sealed with an epoxy resin, to thereby produce a chip-type capacitor. Thus produced capacitors had a capacitance appearance ratio of 85%, average capacitance of 513 μF/capacitor and average ESR value of 25 mΩ.

Comparative Example 3

A hydrogenated niobium powder containing 9% by mass of oxygen and having an average particle size of 0.5 μm without containing a pore-forming agent was prepared. The niobium powder was placed in a solution in which 40 g of camphor was dissolved in 1 litter of toluene and then mixed well to obtain a slurry liquid. Next, a mask having a thickness of 0.2 mm and having a plurality of openings in a lattice-like pattern for formation of a powder-sintering layer of 3.3 mm×4.3 mm was mounted on a niobium foil having a thickness of 50 μm. Subsequently, the slurry liquid was discharged from a die-coating mold attached on the tip of a dispenser and applied onto the lattice-like surface of the mask, thereby forming a slurry layer on a niobium foil. The slurry layer was hot-air dried at about 60° C. The niobium foil was reversed and then placed thereon a mask having the same shape as described above so that the front and back surfaces could be symmetrical with each other with respect to the niobium foil as a symmetrical axis. The slurry liquid was discharged from the die-coating mold attached on the tip of the dispenser and applied onto the lattice-like surface of the mask to form a slurry layer on the niobium foil, followed by hot-air drying at about 60° C. After removing both masks on the front and back surfaces of the niobium foil, it was heated at 250 to 400° C. at a pressure of $10^{-2}$ to $10^2$ Pa to remove camphor and hydrogen and then left standing at 1,170° C. for 30 minutes under a reduced pressure of $4 \times 10^{-3}$ Pa to carry out sintering, followed by cooling down to a product temperature of 30° C. or lower. Consequently, island-like laminates formed of oxygen-containing niobium on corresponding positions of the both surfaces of the niobium foil were obtained. With respect to each of the laminates (i.e. oxygen-containing layer/niobium foil/oxygen-containing layer), the three sides therearound were cut with the other one side being left uncut to serve as a leading line made only of the niobium foil, whereby the respective molded bodies were obtained.

The niobium molded body had an oxygen content of 1.8% by mass, a volume of about 2.8 mm$^3$, and a density of 3.4 g/ml, and a specific surface area of 0.016 m$^2$/mm$^3$. Furthermore, the pore ratio was 60%, and there was a pore diameter peak top only at about 0.4 μm. The volume of the pores of 1 μm or more was 5% by volume.

Next, 300 of the niobium molded bodies were prepared and then subjected to electrolytic formation at a voltage of 20 V using a 0.1% aqueous solution of phosphoric acid to form a dielectric material oxide film on the surface of niobium molded bodies, to thereby obtain niobium anode bodies. For the niobium anode bodies, using the same method as the capacitor manufacturing method 4, a conductive polymer layer, a carbon paste layer, and a silver paste layer were laminated successively. Then, three of the niobium anode bodies were arranged and then niobium foils as leading lines were welded together with spacers having a thickness of about 400 μm and made of copper. For 100 of niobium anode units each comprising a series of three niobium anode bodies combined, a silver paste layer was further laminated. Subsequently, after welding a lead frame thereon, the whole was embodied in an epoxy resin, to thereby produce a chip-type capacitor. Thus produced capacitors had a capacitance appearance ratio of 85%, average capacitance of 507 μF/capacitor and average ESR of 30 mΩ.

Comparative Example 4

A tantalum powder having an average particle size of 0.5 μm and containing 8% by mass of oxygen in the absence of a pore-forming agent was prepared. The tantalum powder was placed in a solution in which 40 g of camphor was dissolved in one litter of toluene and then mixed well. Under a reduced pressure of about 1×10$^2$ Pa, the toluene was distilled off at about 60° C. to obtain a mixture containing tantalum, barium oxide, and camphor. Furthermore, the mixture powder was automatically molded together with a tantalum wire having a diameter of 0.20 mm so as to be approximately 0.4 mm×1.8 mm×4.3 mm (about 3.10 mm$^3$) in dimensions. The molded body had a density in terms of tantalum of 5.0 g/ml. The molded body was heated at 250 to 400° C. under 10$^{-2}$ to 10$^2$ Pa to remove camphor and then left standing at 1,300° C. for 30 minutes under a reduced pressure of 4×10$^{-3}$ Pa, followed by cooling down until the product temperature reaches to 30° C. or lower. Consequently, molded body of tantalum containing oxygen and having a tantalum lead was obtained. The molded body of the mixture had a density in terms of tantalum of 5.7 g/ml.

The tantalum molded body had an oxygen content of 1.5% by mass, a volume of about 2.6 mm$^3$, and a density of 5.7 g/ml, and a specific surface area of 0.019 m$^2$/mm$^3$. Furthermore, the pore ratio was 63%, and there was a pore diameter peak top only at about 0.4 μm. The volume of the pores of 1 μm or more was 5% by volume.

Next, 600 of the niobium molded bodies were prepared and then subjected to electrolytic formation at a voltage of 20 V using a 0.1% aqueous solution of phosphoric acid to form a dielectric material oxide film on the surfaces of niobium molded bodies, thereby obtaining a tantalum anode. For the tantalum anode, using the same method as the capacitor manufacturing method 1, an inorganic semiconductor layer, a carbon paste layer, and a silver paste layer were laminated successively. Then, 6 of the tantalum anode bodies were laminated as shown in FIGS. 2 and 3 and then leading lines were spot-welded on a bar made of copper. The 6 tantalum anode bodies were combined to form a tantalum anode unit comprising a series of six tantalum anode bodies. For each of 100 of the tantalum anode units, a silver paste layer was further laminated. Subsequently, after mounting a lead frame thereon, the whole was sealed with an epoxy resin, to thereby produce a chip-type capacitor. Thus produced capacitors had a capacitance appearance ratio of 85%, average capacitance of 511 μF/capacitor and average ESR value of 44 mΩ.

TABLE 1

| | Anode material | Oxygen content in raw material | Shape of anode (No. of attached figs.) | Cathode agent | Anode type | Reducing agent | Capacitor manufacturing method | Presence or absence of nitriding | Pore-forming agent | Other components |
|---|---|---|---|---|---|---|---|---|---|---|
| Example 1 | Nb | 12% | FIG. 1 | Polythiophene | With lead | Metal Mg | Manufacturing method 4 | None | Ca oxide | |
| Example 2 | Nb | 15% | FIG. 2-a, 2-b | Polypyrrole | Thin type with lead | " | Manufacturing method 3 | " | Ba oxide | |
| Example 3 | Nb | 9% | FIG. 3-a, 3-b | Polythiophene | Foil (on both sides) | " | Manufacturing method 4 | " | Mg hydroxide | |
| Example 4 | Ta | 8% | FIG. 2-a, 2-b | Manganese dioxide | With lead | " | Manufacturing method 1 | " | Ba oxide | |
| Example 5 | Nb | 12% | FIG. 1 | Polypyrrole | With lead | " | Manufacturing method 3 | " | Ca oxide | |
| Example 6 | Nb | 9% | FIG. 3-a, 3-b | Polythiophene | Foil (on both side) | " | Manufacturing method 4 | 0.4% | Mg oxide | |
| Example 7 | Nb | 26% | FIG. 3-a, 3-b | Polythiophene | Foil (on both sides) | " | Manufacturing method 4 | None | Mg oxide | |
| Example 8 | Nb | 9% | FIG. 2-a, 2-b | Polypyrrole | Thin type with lead | " | Manufacturing method 3 | " | Al oxide | Al |
| Example 9 | Nb | 8% | FIG. 2-a, 2-b | Polypyrrole | Thin type with lead | " | Manufacturing method 3 | " | Mg hydroxide | W |
| Example 10 | Nb | 20% | FIG. 2-a, 2-b | Polythiophene | Thin type with lead | " | Manufacturing method 4 | " | Mg oxide | Ta |
| Example 11 | Nb | 18% | FIG. 2-a, 2-b | Polythiophene | Thin type with lead | " | Manufacturing method 4 | " | Ca hydroxide | Hf |

TABLE 1-continued

| | Anode material | Oxygen content in raw material | Shape of anode (No. of attached figs.) | Cathode agent | Anode type | Reducing agent | Capacitor manufacturing method | Presence or absence of nitriding | Pore-forming agent | Other components |
|---|---|---|---|---|---|---|---|---|---|---|
| Example 12 | Nb | 7% | FIG. 2-a, 2-b | Polypyrrole | Thin type with lead | " | Manufacturing method 3 | " | Ba oxide + Ca oxide | Zr |
| Example 13 | Nb | 15% | FIG. 2-a, 2-b | Polypyrrole | Thin type with lead | " | Manufacturing method 3 | " | Nd oxide | Nd |
| Example 14 | Nb | 12% | FIG. 2-a, 2-b | Polythiophene | Thin type with lead | Metal Mg | Manufacturing method 4 | None | Ba hydroxide | Zn |
| Example 15 | Nb | 6% | FIG. 2-a, 2-b | Polypyrrole | Thin type with lead | " | Manufacturing method 3 | " | Mg oxide | B |
| Example 16 | Nb | 8% | FIG. 2-a, 2-b | Polythiophene | Thin type with lead | " | Manufacturing method 4 | " | Ca oxide | Mn |
| Example 17 | Nb | 10% | FIG. 2-a, 2-b | Polythiophene | Thin type with lead | " | Manufacturing method 4 | " | Ba oxide | Sb |
| Example 18 | Nb | 12% | FIG. 2-a, 2-b | Polypyrrole | Thin type with lead | " | Manufacturing method 3 | " | Ce oxide | Si |
| Example 19 | Nb | 9% | FIG. 2-a, 2-b | Polythiophene | Thin type with lead | " | manufacturing method 4 | " | Y oxide + La oxide | Y + Er |
| Example 20 | Nb | 14% | FIG. 2-a, 2-b | Polypyrrole | Thin type with lead | " | Manufacturing method 3 | " | Ce oxide + Sm oxide | Yb + Lu |
| Example 21 | Nb | 8% | FIG. 2-a, 2-b | Polythiophene | Thin type with lead | " | manufacturing method 4 | " | Mg oxide + Mn oxide | Ta + N |
| Example 22 | Nb | 9% | FIG 2-a, 2-b | Polythiophene | Thin type with lead | " | Manufacturing method 4 | " | Mg carbonate | Mo + V |
| Example 23 | Nb | 6% | FIG. 2-a, 2-b | Polypyrrole | Thin type with lead | " | Manufacturing method 3 | " | Mg oxide | Si + N |
| Example 24 | Nb | 12% | FIG. 4 (A) | Polythiophene | Cylindrical type with lead | " | Manufacturing method 4 | " | Mg oxide | |
| Example 25 | Nb | 12% | FIG. 4 (B) | Polythiophene | Connected body of cylindrical type with lead | " | Manufacturing method 4 | " | Mg oxide | |

TABLE 2

Figure 6:
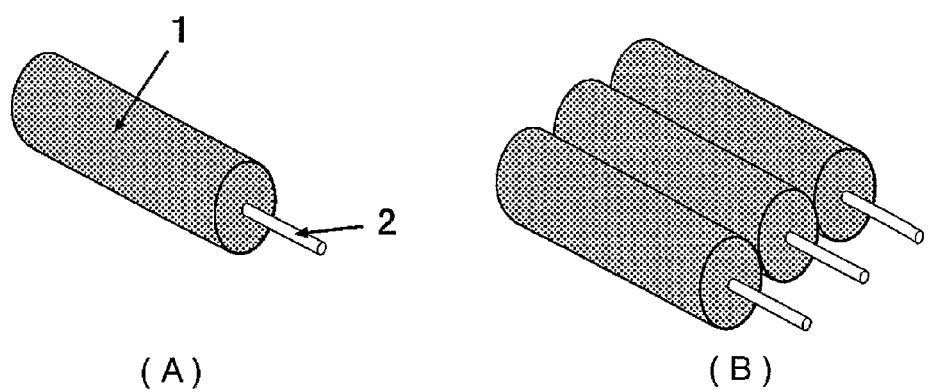
FIG. 6 (A) is a perspective diagram of a cylindrical type porous anode with a lead, and FIG. 6 (B) is a perspective diagram of an example of a parallel connection of the anodes shown in FIG. 6 (A).
Figure 7:
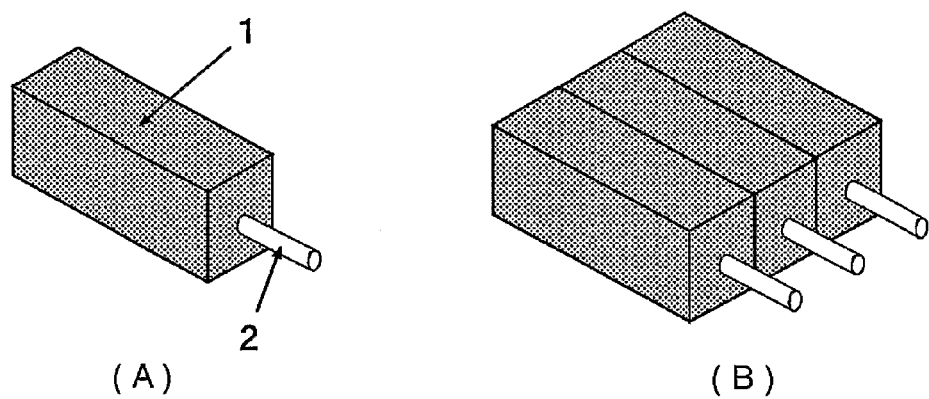
FIG. 7 (A) is a perspective diagram of a rectangular type porous anode with a lead, and FIG. 7 (B) is a perspective diagram of an example of a parallel connection of the anodes shown in FIG. 7 (A).

| | Anode material | Oxygen content in raw material | Shape of anode (No. of attached figs.) | Cathode agent | Anode type | Reducing agent | Manufacturing method of capacitor | Presence or absence of nitriding | Pore-forming agent | Other components |
|---|---|---|---|---|---|---|---|---|---|---|
| Example 26 | Nb | 15% | FIG. 5 (A) | Polythiophene | Rectangular type with lead | Metal Mg | Manufacturing method 4 | Non | Mg oxide | |
| Example 27 | Nb | 8% | FIG. 5 (B) | Polythiophene | Connected body of rectangular type with lead | " | Manufacturing method 4 | " | Mg oxide | |
| Example 28 | Nb | 12% | FIG. 6 (B) | Polythiophene | Foil (on one side) | " | Manufacturing method 4 | " | Mg oxide | |
| Example 29 | Nb | 12% | FIG. 7 (B) | Polythiophene | Without lead (lead rod welding) | " | Manufacturing method 4 | " | Mg oxide | |
| Example 30 | Nb | 12% | FIG. 7 (C) | Polythiophene | Thin type without lead (lead foil welding) | " | Manufacturing method 4 | " | Mg oxide | |
| Example 31 | Nb | 12% | FIG. 7 (D) | Polythiophene | Thin type without lead (lead foil welding) | " | Manufacturing method 4 | " | Mg oxide | |
| Example 32 | Nb | 9% | FIG. 8-b | Polythiophene | Laminated body of thin type without lead | " | Manufacturing method 4 | " | Mg oxide | |
| Example 33 | Nb | 9% | FIG. 8-c | Polythiophene | Laminated body of thin type without lead | " | Manufacturing method 4 | " | Mg oxide | |
| Example 34 | Nb | 12% | FIG. 1 | Polythiophene | With lead | " | Manufacturing method 4 | " | Mg oxide | |
| Example 35 | Nb | 12% | FIG. 1 | Polythiophene | With lead | " | Manufacturing method 4 | " | Mg oxide | |

TABLE 2-continued

| | Anode material | Oxygen content in raw material | Shape of anode (No. of attached figs.) | Cathode agent | Anode type | Reducing agent | Manufacturing method of capacitor | Presence or absence of nitriding | Pore-forming agent | Other components |
|---|---|---|---|---|---|---|---|---|---|---|
| Example 36 | Nb | 12% | FIG. 1 | Polythiophene | With lead | Metal Mg | Manufacturing method 4 | None | Mg oxide | |
| Example 37 | Nb | 12% | FIG. 2-a, 2-b | Polythiophene | Thin type with lead | " | Manufacturing method 4 | " | Mg oxide | |
| Example 38 | Nb | 12% | FIG. 3-a, 3-b | Polythiophene | Foil (on both sides) | " | Manufacturing method 4 | " | Mg oxide | |
| Example 39 | Nb | 12% | FIG. 1 | Lead dioxide/ lead sulfide | With lead | " | Manufacturing method 2 | " | Mg oxide | |
| Example 40 | Nb | 12% | FIG. 1 | Polypyrrole | With lead | " | Manufacturing method 5 | " | Mg oxide | |
| Example 41 | Nb | 12% | FIG. 1 | Polythiophene | With lead | " | Manufacturing method 6 | " | Mg oxide | |
| Example 42 | Nb | 6% | FIG. 1 | Polythiophene | With lead | " | Manufacturing method 4 | " | Mg oxide | |
| Example 43 | Nb | 12% | FIG. 1 | Polythiophene | With lead | " | Manufacturing method 4 | " | Mg oxide | |
| Comparative example 1 | Nb | 12% | FIG. 1 | Polythiophene | With lead | Metal Mg | Manufacturing method 4 | None | Non | |
| Comparative example 2 | Nb | 15% | FIG. 2-a, 2-b | Polypyrrole | Thin type with lead | " | Manufacturing method 3 | " | Non | |
| Comparative example 3 | Nb | 9% | FIG. 3-a, 3-b | Thiophene | Foil (on both sides) | " | Manufacturing method 4 | " | Non | |
| Comparative example 4 | Ta | 8% | FIG. 2-a, 2-b | Manganese dioxide | Thin type with lead | " | Manufacturing method 1 | " | Non | |

TABLE 3

| | Porous molded body [mm³ × number of molded body] | BET specific surface area of molded body [m²/g] | Oxygen content in molded body [mass %] | Pore peak top [μm] | Pore content [vol %] | 1 μm or more pore content [vol %] | Capacity appearance ratio [%] | Capacity [μF/capacitor] | ESR [Ω] |
|---|---|---|---|---|---|---|---|---|---|
| Example 1 | 22 × 1 | 0.023 | 2.4 | 0.9, 2.0, 30 | 61 | 18 | 99 | 991 | 18 |
| Example 2 | 2.6 × 6 | 0.024 | 1.8 | 0.7, 2.0, 20 | 60 | 17 | 99 | 749 | 4 |
| Example 3 | 2.8 × 6 | 0.021 | 1.3 | 0.7, 2.0, 10 | 60 | 16 | 99 | 724 | 6 |
| Example 4 | 2.6 × 6 | 0.026 | 0.9 | 0.7, 2.0, 20 | 66 | 18 | 99 | 728 | 18 |
| Example 5 | 22 × 1 | 0.024 | 3.2 | 0.9, 2.0, 30 | 61 | 18 | 99 | 983 | 18 |
| Example 6 | 2.8 × 6 | 0.022 | 1.1 | 0.7, 2.0, 10 | 60 | 17 | 99 | 735 | 6 |
| Example 7 | 2.8 × 6 | 0.025 | 14.6 | 0.7, 2.0, 10 | 60 | 17 | 99 | 743 | 7 |
| Example 8 | 2.6 × 6 | 0.025 | 1.5 | 0.7, 2.0, 20 | 61 | 18 | 99 | 723 | 4 |
| Example 9 | 2.6 × 6 | 0.024 | 1.2 | 0.7, 2.0, 20 | 60 | 17 | 99 | 726 | 3 |
| Example 10 | 2.6 × 6 | 0.024 | 12.4 | 0.7, 2.0, 20 | 60 | 17 | 99 | 728 | 3 |
| Example 11 | 2.6 × 6 | 0.023 | 10.3 | 0.7, 2.0, 20 | 60 | 18 | 99 | 724 | 4 |
| Example 12 | 2.6 × 6 | 0.025 | 1.0 | 0.7, 2.0, 20 | 66 | 18 | 99 | 726 | 7 |
| Example 13 | 2.6 × 6 | 0.022 | 4.3 | 0.7, 2.0, 20 | 61 | 17 | 99 | 728 | 6 |
| Example 14 | 2.6 × 6 | 0.023 | 2.5 | 0.7, 2.0, 20 | 60 | 17 | 99 | 721 | 7 |
| Example 15 | 2.6 × 6 | 0.026 | 0.9 | 0.7, 2.0, 20 | 60 | 18 | 99 | 724 | 6 |
| Example 16 | 2.6 × 6 | 0.025 | 1.3 | 0.7, 2.0, 20 | 61 | 17 | 99 | 722 | 7 |
| Example 17 | 2.6 × 6 | 0.026 | 1.7 | 0.7, 2.0, 20 | 60 | 17 | 99 | 727 | 7 |
| Example 18 | 2.6 × 6 | 0.022 | 2.7 | 0.7, 2.0, 20 | 60 | 16 | 99 | 725 | 3 |
| Example 19 | 2.6 × 6 | 0.022 | 1.6 | 0.7, 2.0, 20 | 61 | 18 | 99 | 726 | 6 |
| Example 20 | 2.6 × 6 | 0.024 | 4.3 | 0.7, 2.0, 20 | 60 | 18 | 99 | 723 | 6 |
| Example 21 | 2.6 × 6 | 0.025 | 1.4 | 0.7, 2.0, 20 | 60 | 17 | 99 | 720 | 4 |
| Example 22 | 2.6 × 6 | 0.022 | 1.6 | 0.7, 2.0, 20 | 60 | 17 | 99 | 728 | 7 |
| Example 23 | 2.6 × 6 | 0.024 | 1.1 | 0.7, 2.0, 20 | 61 | 18 | 99 | 727 | 3 |

INDUSTRIAL APPLICABILITY

The present invention provides a method of manufacturing a porous anode for a solid electrolytic capacitor, in which a reduction reaction is carried out on a molded body made of a mixture containing a niobium material and/or a tantalum material and a pore-forming agent and the oxygen content in at least one of the niobium material and the tantalum material is controlled, followed by removing the pore-forming agent which cannot be removed at the temperature of the reduction reaction and remains in a solid state in the material. According to the manufacturing method of the present invention, by controlling the kind, average particle size and the amount added of the pore-forming agent, the peak position, the number and quantity of the pores can be controlled in the pore diameter distribution on the basis of the kind of the cathode agent, to thereby improve the property for impregnation with the cathode agent. In particular, in a large-sized porous anode having a volume of 10 mm³ or more and a pore content of 55% by volume or more, the volume of pores of 1 μm or more can be adjusted to 10% by volume or more of the total pore volume, to thereby improve the property for impregnation with the cathode agent, whereby a solid electrolytic capacitor having high capacitance, low ESR, and good tan δ characteristics, as well as long-term reliability can be obtained.

The invention claimed is:

1. A method of manufacturing a porous anode for a solid electrolytic capacitor, comprising a step of subjecting a molded body containing powder of at least one material selected from an oxygen-containing niobium material and an oxygen-containing tantalum material and a pore-forming agent which is solid at reduction temperature to reduction reaction using a reducing agent and another step of removing the pore-forming agent from a resulting product of the reduction reaction.

2. The manufacturing method according to claim 1, in which the niobium material is at least one selected from niobium, a niobium alloy, and a niobium compound and the tantalum material is selected from tantalum, a tantalum alloy and a tantalum compound.

3. The manufacturing method according to claim 1, in which the oxygen content of the oxygen-containing niobium material or the oxygen-containing tantalum material is 50% by mass or less and the material contains at least one crystal selected from niobium, hexaniobium monoxide, niobium monoxide, niobium dioxide, niobium pentoxide, tantalum and tantalum pentoxide.

4. The manufacturing method according to claim 1, in which the oxygen-containing niobium material includes at least one element selected from hydrogen, boron, nitrogen, antimony, tantalum, zirconium, tungsten, silicon and aluminum.

5. The manufacturing method according to claim 1, in which the oxygen-containing tantalum material includes at least one element selected from hydrogen, boron, nitrogen, antimony, niobium, zirconium, tungsten, silicon and aluminum.

6. The manufacturing method according to claim 1, in which the molded body contains silicon nitride.

7. The manufacturing method according to claim 1, in which the reducing agent is at least one selected from metals, alloys and hydrides thereof, having oxygen affinity higher than that of tantalum.

8. The manufacturing method according to claim 7, in which the reducing agent is at least one selected from the group consisting of lithium, sodium, potassium, rubidium, beryllium, magnesium, calcium, strontium, barium, lanthanum, cerium, praseodymium, neodymium, samarium, europium, gadolinium, terbium, dysprosium, holmium, erbium, thulium, ytterbium, lutetium, misch metal, yttrium, aluminum, tantalum, niobium, carbon, silicon, alloys and hydrides thereof, and hydrogen.

9. The manufacturing method according to claim 1, in which the configuration of the molded body is from a molded body having a lead or a thin molded body integrated with a substrate, in which the lead or the substrate is at least one selected from niobium, a niobium alloy, a niobium compound, tantalum, a tantalum alloy and a tantalum compound.

10. The manufacturing method according to claim 9, in which the thickness of the molded body is 1 mm or less.

11. The manufacturing method according to claim 1, further including a step of sintering the molded body before the reduction reaction step and the pore-forming agent is solid at the sintering temperature.

12. The manufacturing method according to claim 11, in which the sintering is carried out at a temperature of 500 to 2,000° C.

13. The manufacturing method according to claim 1, in which the molded body or a sintered body thereof is mixed with a reducing agent before the reduction reaction step.

14. The manufacturing method according to claim 13, in which the mixing is carried out at a temperature of 50° C. or lower.

15. The manufacturing method according to claim 1, in which in the reduction reaction step, heating is carried out at a temperature of from 450 to 2,000° C.

16. The manufacturing method according to claim 15, in which the heating is carried out at a temperature-rising rate of 12° C. per minute or less.

17. The manufacturing method according to claim 1, further including a step of carrying out slow oxidation using an oxygen-containing gas diluted to 0.1 to 21% by mass in oxygen content with an inert gas before the step of removing a pore-forming agent after the reduction reaction step.

18. The manufacturing method according to claim 17, in which the slow oxidation is carried out at a temperature of 60° C. or lower.

19. The manufacturing method according to claim 1, in which the step of removing the pore-forming agent is one in which the removal is carried out using at least one solvent selected from water, an organic solvent, an acidic solvent, an alkaline solvent, an amine-containing solvent, an amino acid-containing solvent, a poly-phosphoric acid-containing solvent, a crown ether solvent, a chelator-containing solvent, an ammonium salt-containing solvent and an ion exchange resin-dispersing solvent.

20. The manufacturing method according to claim 19, in which the temperature for removing the pore-forming agent is 50° C. or lower.

21. The manufacturing method according to claim 1, further including a step of removing the remaining reducing agent before the step of removing the pore-forming agent after the reduction reaction step.

22. The manufacturing method according to claim 21, in which the step of removing the remaining reducing agent is carried out at a temperature of from 450 to 2,000° C. under highly-reduced pressure.

23. The manufacturing method according to claim 1, further including a step of doping the molded body or the sintered body with at least one element selected from the group consisting of nitrogen, boron, phosphorus, sulfur, selenium, tellurium, aluminum, silicon and antimony before the reduction reaction step or before the step of removing the pore-forming agent after the reduction reaction step.

24. The manufacturing method according to claim 1, further including a step of dehydrogenation before the reduction reaction step, during the reduction reaction step, before the step of removing the pore-forming agent after the reduction reaction step or after the step of removing the pore-forming agent.

25. An anode for a solid electrolytic capacitor manufactured by the method described in claim 1.

26. A method for producing a solid electrolytic capacitor, wherein a porous anode for the solid electrolytic capacitor is manufactured by the method described in claim 1, which is provided as one electrode and a counter electrode is provided via a dielectric material.

27. The method for producing a solid electrolytic capacitor according to claim 26, wherein the capacitor has a structure in which the two or more porous anodes are electrically connected in parallel to each other.

28. The solid electrolytic capacitor produced by the method according to claim 26.

29. An electronic circuit, wherein the solid electrolytic capacitor according to claim 28 is mounted.

30. An electronic instrument, wherein the solid electrolytic capacitor according to claim 28 is mounted.

* * * * *